(12) United States Patent
Armitage et al.

(10) Patent No.: US 6,282,082 B1
(45) Date of Patent: Aug. 28, 2001

(54) CASE FOR A MODULAR TABLET COMPUTER SYSTEM

(75) Inventors: David L. Armitage, Golden; David Roecker, Denver; Jerry Greenwald, Lakewood; Joe Kapushion, Broomfield; Jim Keen, Denver; Randy Leander, Littleton, all of CO (US)

(73) Assignee: Qubit, LLC, Lakewood, CO (US)

( * ) Notice: Subject to any disclaimer, the term of this patent is extended or adjusted under 35 U.S.C. 154(b) by 0 days.

(21) Appl. No.: 09/127,662

(22) Filed: Jul. 31, 1998

(51) Int. Cl.[7] .................................................... G06F 1/16
(52) U.S. Cl. ...................... 361/681; 361/683; 345/169; 312/223.2
(58) Field of Search .................................... 361/681, 682, 361/683, 684; 345/169, 905; 312/223.1–223.6; 248/917–923

(56) References Cited

U.S. PATENT DOCUMENTS

| D. 392,259 | 3/1998 | Simmon | D14/100 |
|---|---|---|---|
| 5,168,426 | * 12/1992 | Hoving et al. | 361/392 |
| 5,247,285 | 9/1993 | Yokota et al. | 361/685 |
| 5,264,992 | 11/1993 | Hogdahl et al. | 361/686 |
| 5,307,297 | 4/1994 | Iguchi et al. | 364/784 |
| 5,408,382 | 4/1995 | Shultz et al. | 361/686 |
| 5,552,957 | 9/1996 | Brown et al. | 361/683 |
| 5,978,211 | * 11/1999 | Hong | 361/683 |
| 6,005,767 | * 12/1999 | Ku et al. | 361/681 |
| 6,028,768 | * 2/2000 | Cipolla | 361/687 |

OTHER PUBLICATIONS

Lucent Technologies, WaveLan Wireless Computing (visited Jun. 5, 1998) <http://www.wavelan.com/about/about.htm>.

Lucent Technologies, WaveLan Wireless Computing (visited Jun. 5, 1998) <http://www.wavelan.com/about/wlconfig.htm>.

Lucent Technologies, WaveLan Wireless Computing (visited Jun. 8, 1998) <http://www.wavelan.com/>.

Honeywell, Honeywell Consumer Products: Parts and Accessories Finder, Model No. S7350A Honeywell Web-PAD® Internet Appliance,http://hcpretail.Honeywell.com/HCP_Store/catalog/product display (3pp.); User Guide (43 pp.).

(List continued on next page.)

Primary Examiner—Leo P. Picard
Assistant Examiner—Hung Van Duong
(74) Attorney, Agent, or Firm—Merchant & Gould P.C.

(57) ABSTRACT

A computer housing or case contains computer system components including a display unit, a processor, and a computer power supply unit. One or more handles are positioned at a side of the case to allow a user to hold the encased computer system while viewing the display. A case has a support interface structure to hold the case steady in an upright position. The support interface structure of the case mates with a complimentary support interface in the weight-supporting base unit and mates with guides to align a power supply port in the case to contact a power supply port in the base unit. A base unit has a keyboard guide to receive a keyboard by lifting the keyboard above a support surface. A modular computer system comprises a tablet computer, a base unit, and a remote keyboard. A first infrared communication device couples the tablet computer to the remote keyboard and other input peripherals. A second infrared communication device couples the tablet computer to a remote printer. A radio frequency network adapter couples the tablet computer to the base unit, which provides additional communications to an external communications network.

9 Claims, 15 Drawing Sheets

OTHER PUBLICATIONS

Honeywell, "Introducing the Honeywell WebPAD® Internet Appliance"; http://content.honeywell.com80/My Home/webpad/webpad_faq.htm (8 pp.).

Your Home Expert –Honeywell's Webpad, http://content.Honeywell.com/yourhome/webpad/webpad_faq.htm (4 pp.).

Sony Computing Products: SDM–N50PS Computer Display, 10/24/00, http://www.ita.sel.sony.com/products/displays/led/sdmn50ps.htm (5 pp.).

Hitachi ePlate HPW–630ETR, http://www.Hitachi.com/products/informa...timedia/handheld3/halp–ZZZDTISNQ7C.htm (5 pp.) with Overview of Handheld PCs (22 pp.).

Palm, "Simplicity, Function and Fun", m100 Handheld product description (2 pp.).

Gateway, Handheld product description, http://www.gateway.com/promotion/handheld/spec, (2 pp.).

Compaq, Pocket PC product features and description, wysiwyg://77/http://www5.Compaq.com/products/handhelds/pocketpc/features, (28 pp.).

epods Internet service, http://www.epods.com/ (4 pp.).

ergo® by 3COM®, products meet Audrey, computer site, product and accessory description, http://ergo.3com.com/ergo/htm/homepage.htm (4 pp.).

* cited by examiner

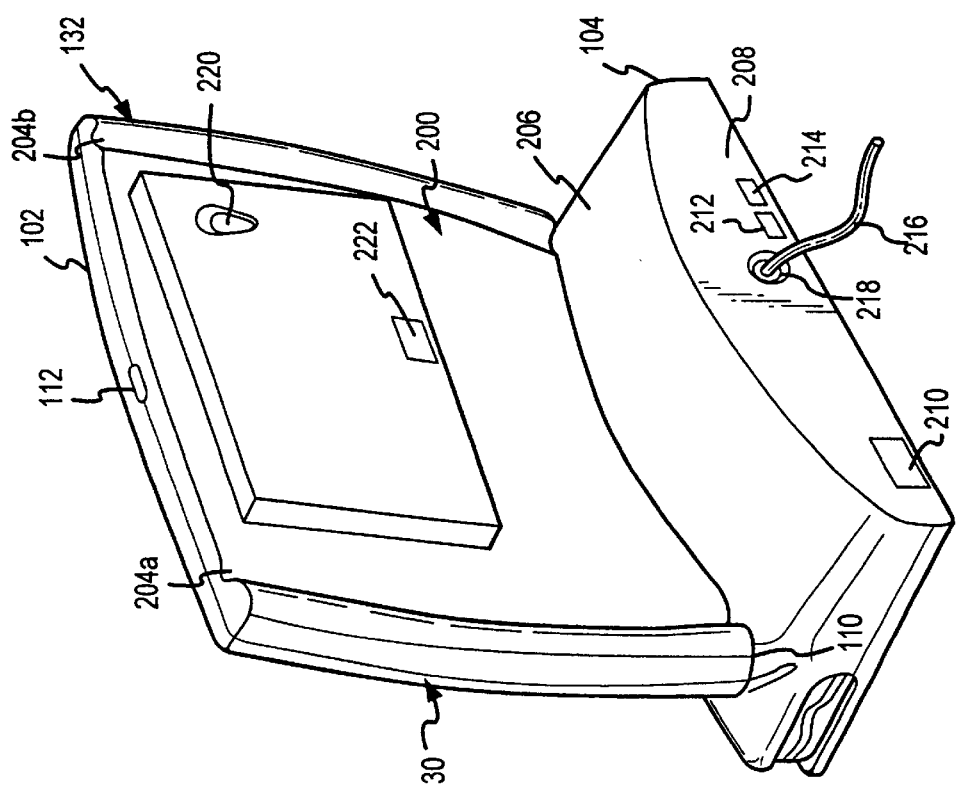
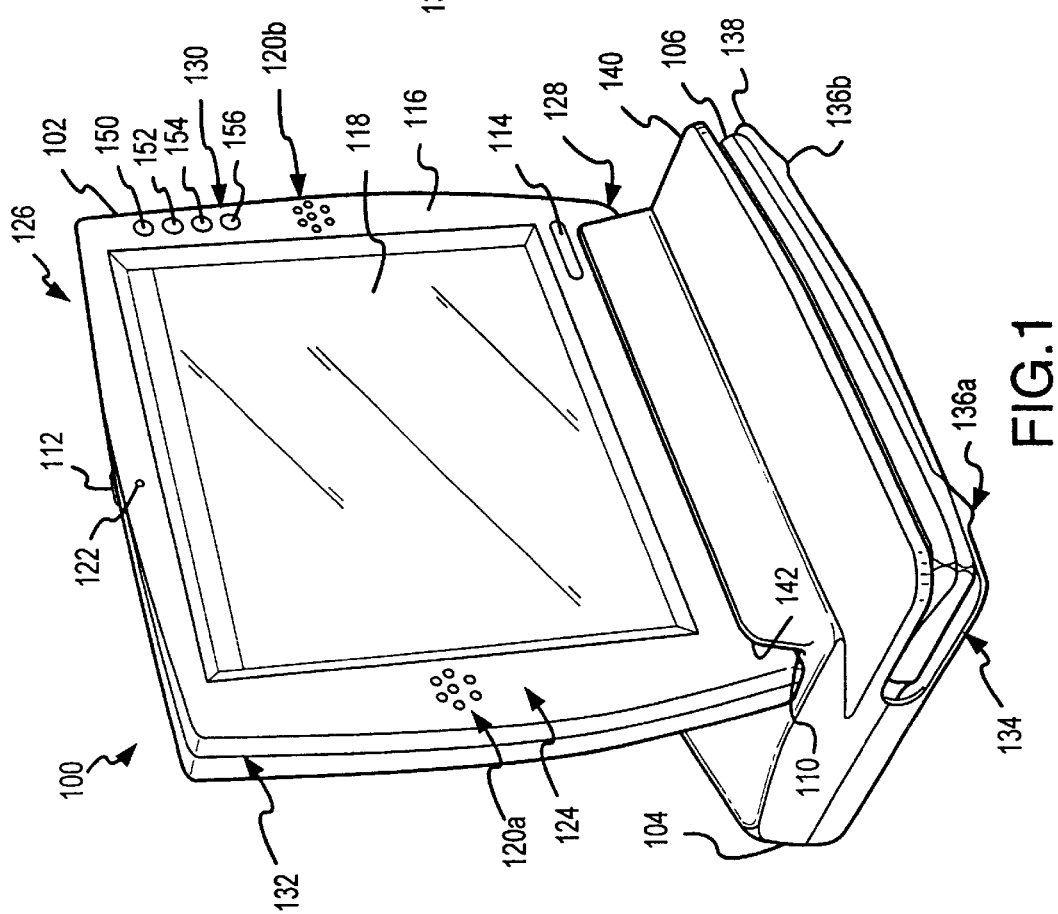

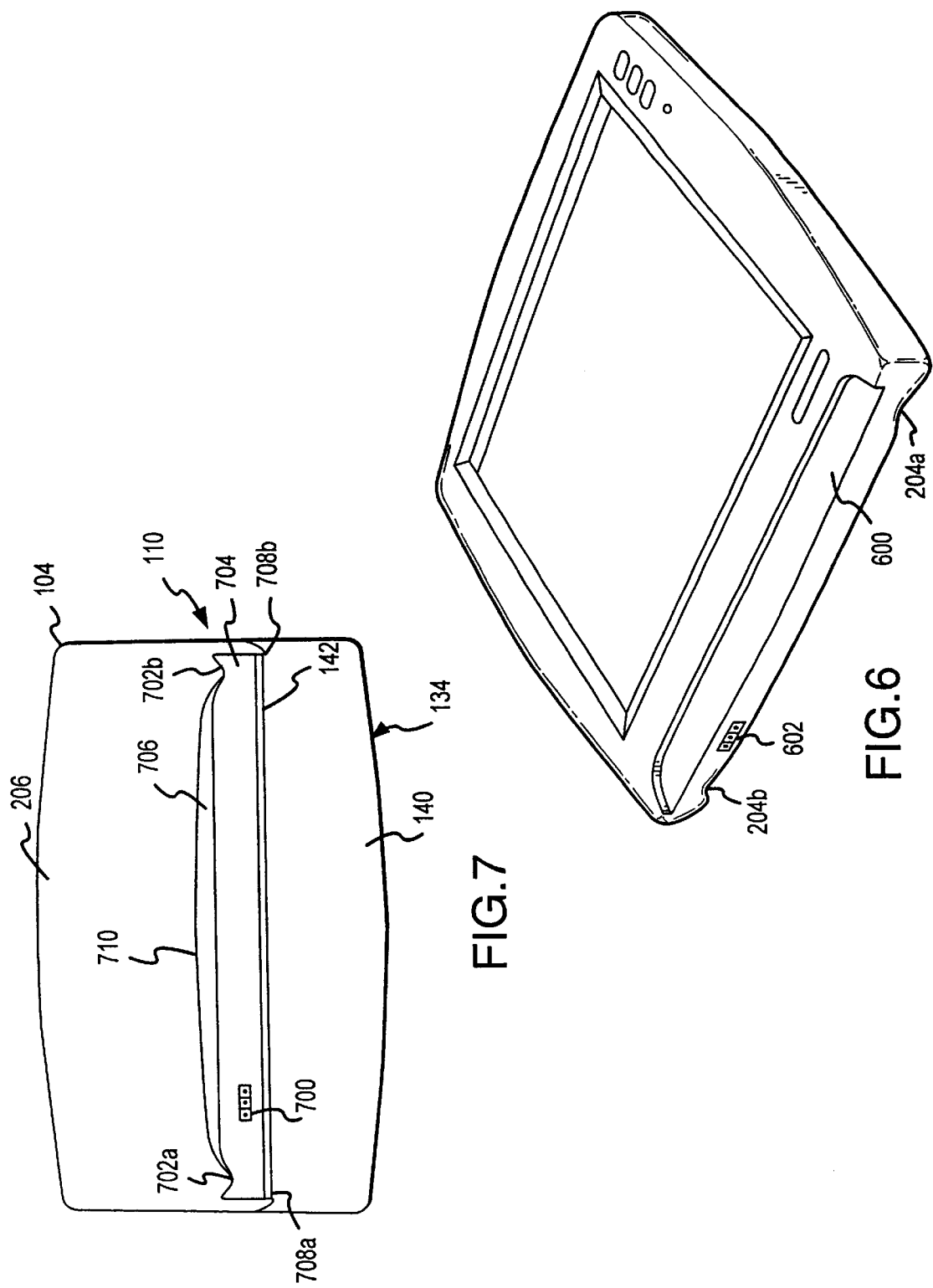

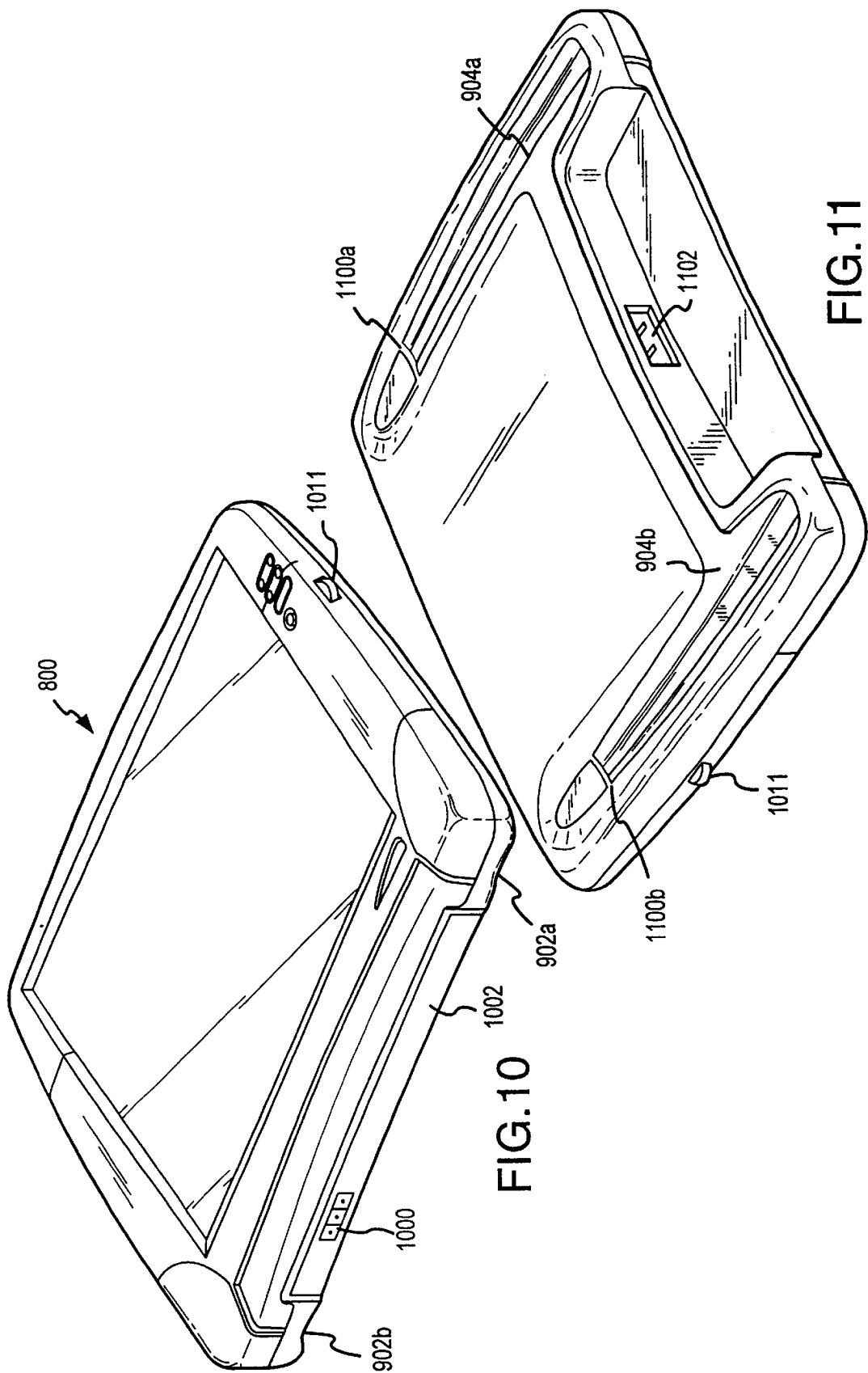

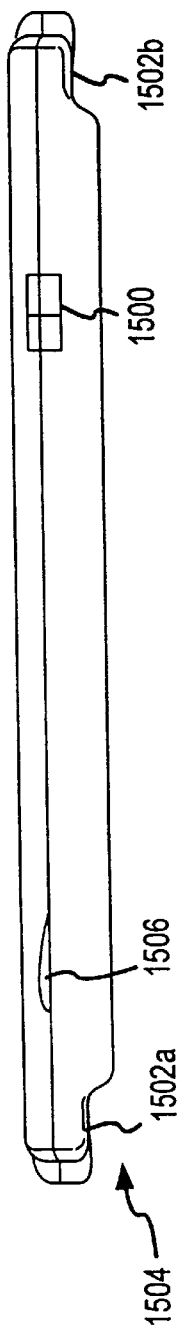
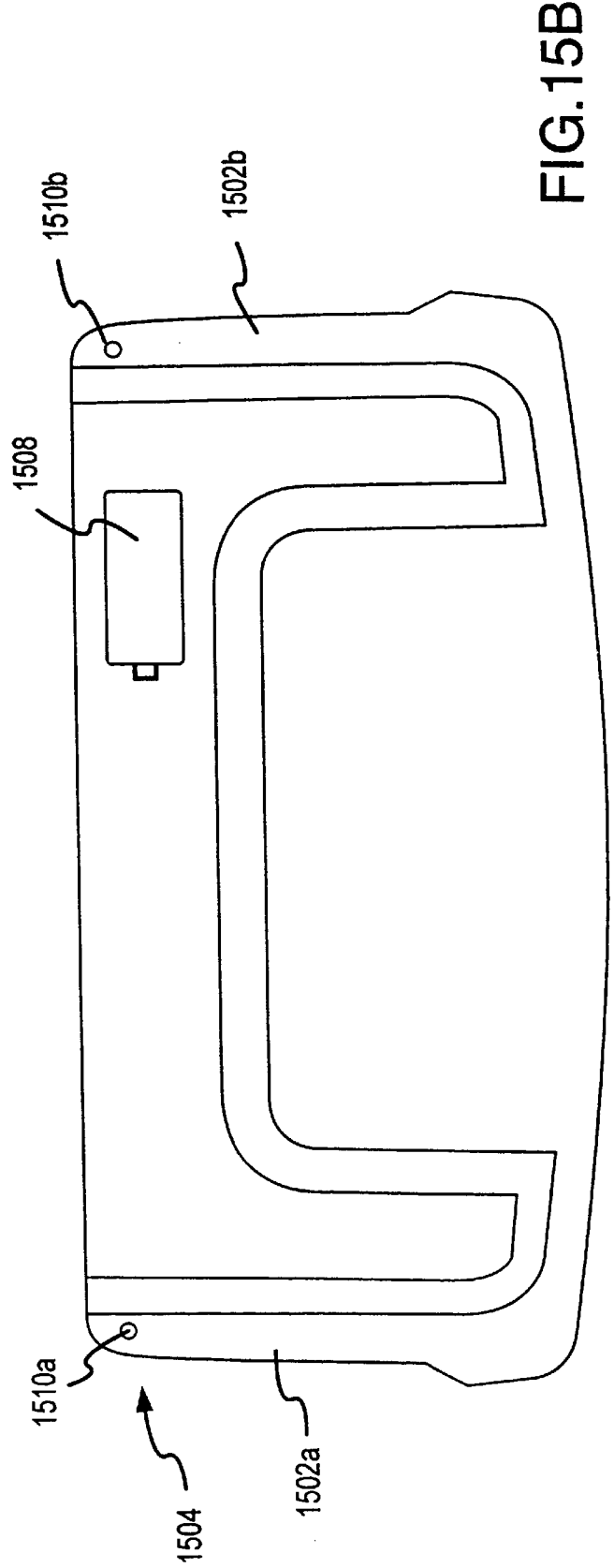
FIG.15A
FIG.15B

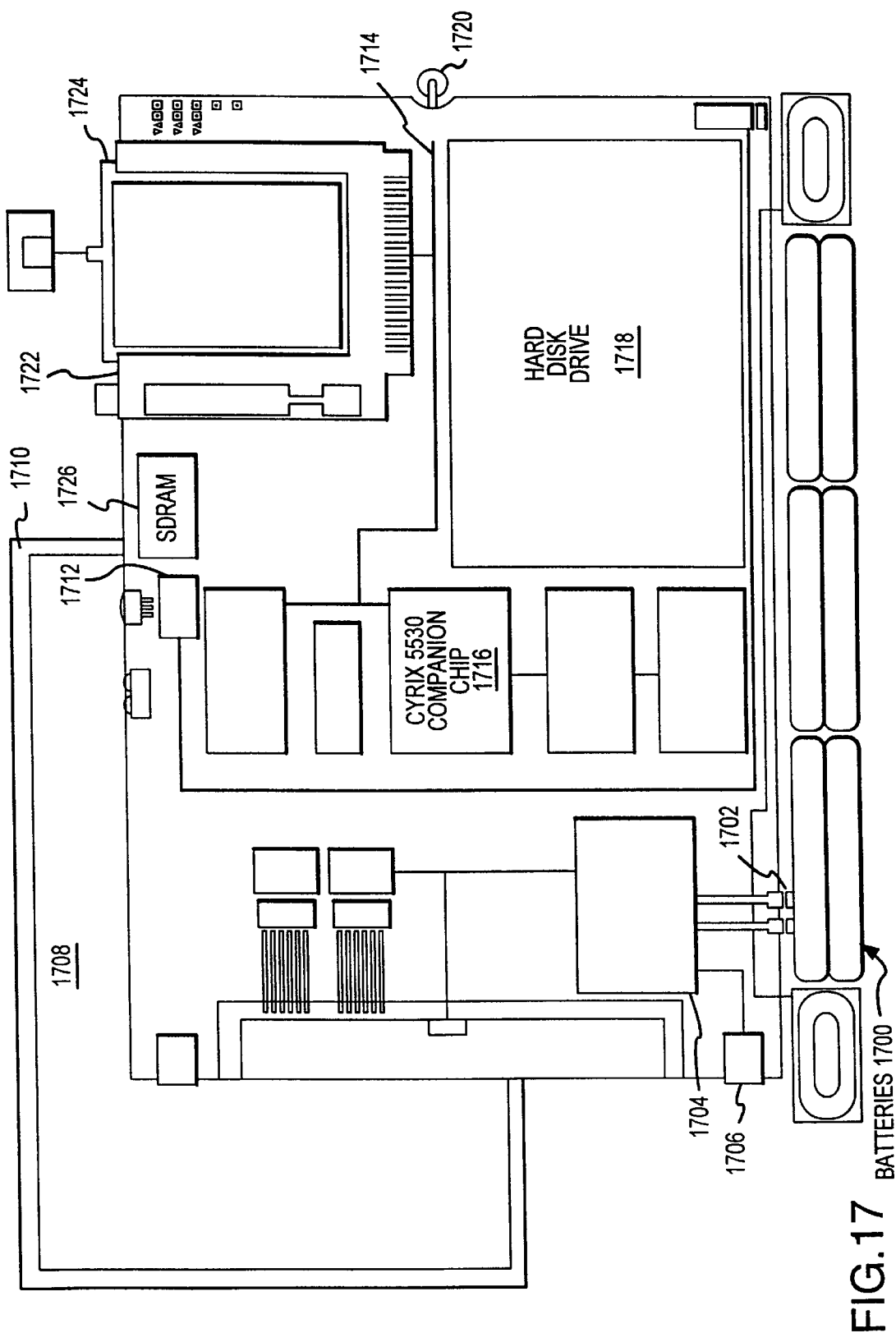
FIG.17 BATTERIES 1700

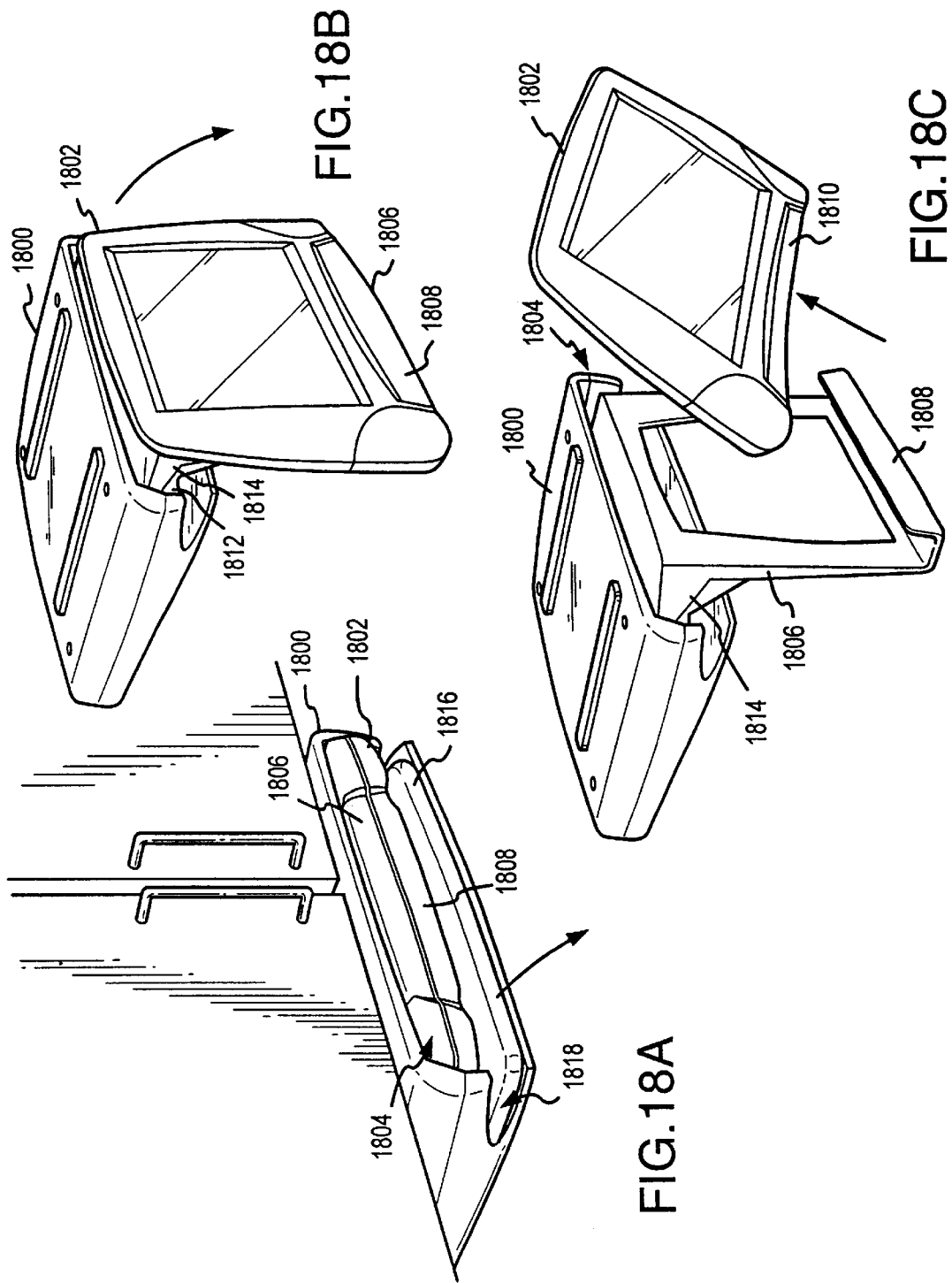

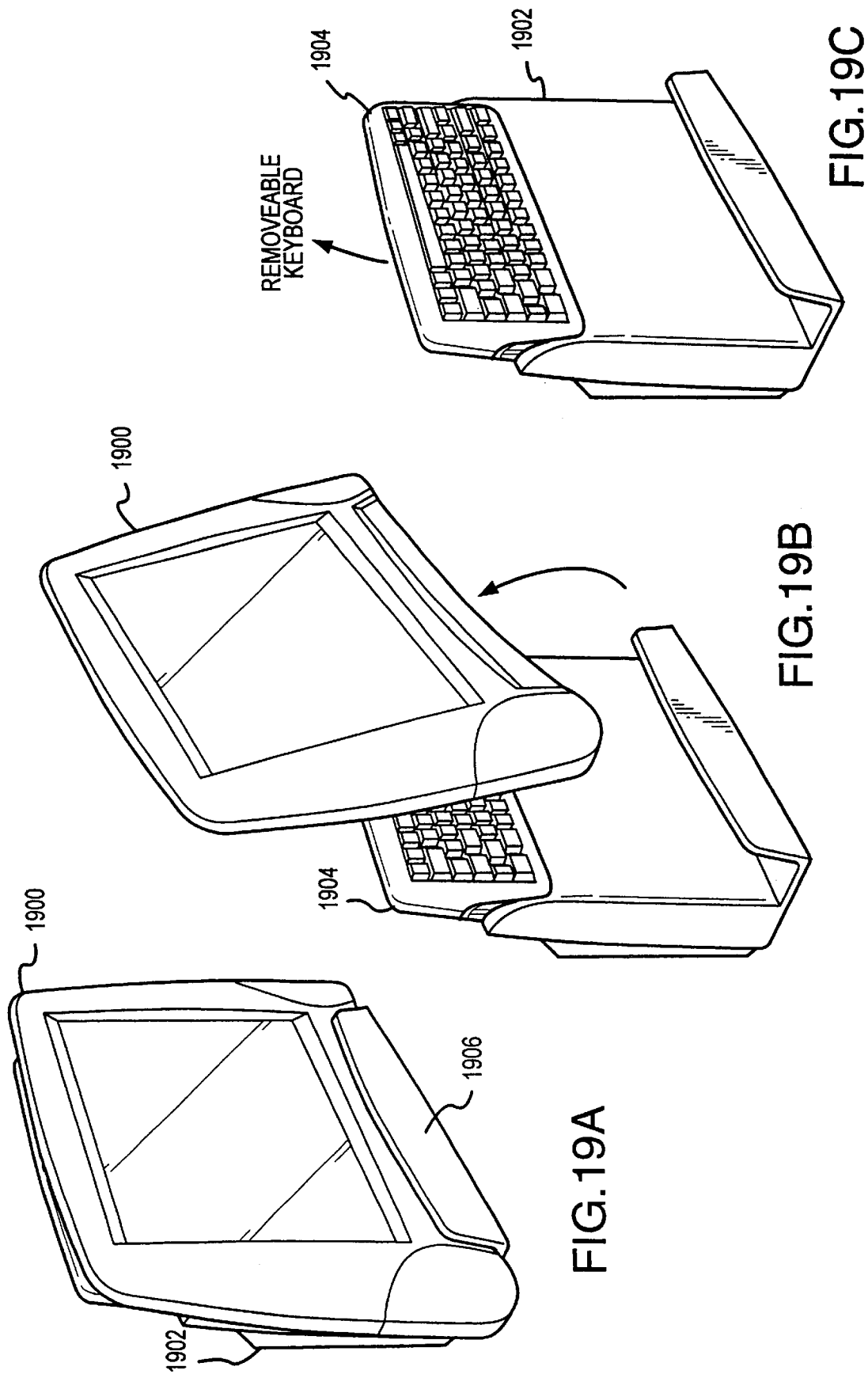

CASE FOR A MODULAR TABLET COMPUTER SYSTEM

BACKGROUND OF THE INVENTION

1. Field of the Invention

The present invention pertains generally to electrical computers and more particularly to modular tablet computer systems and cases for such systems.

2. Description of Related Art

It is common for computer industry pundits to invoke the phrase "ubiquitous computing". Such predictions involve a paradigm where computer use is, at least in a consumer's mind, equivalent to and no less common than telephone or television use. The image of a computer as a common home "appliance" has driven a multitude of marketing campaigns, but computers have yet to be as accepted into consumers' kitchens and living rooms as appliances. Even standard laptop computers fail to satisfy the convenience and usability requirements of a large majority of consumers. Likewise, television-based computing solutions have not yet overcome the inertia surrounding the television's role as a passive entertainment device.

Among the problems with prior attempts to introduce a computer "appliance" are cost, form factor/configuration issues, reliability, complexity, and application choices. Computers have traditionally been priced for a market segment seeking high performance and extensive hardware and software features. For example, desktop computer prices have only recently fallen below the $1000 mark, and such prices often do not include all necessary hardware, such as a monitor, or software, such as word-processing or personal finance applications. As such, need exists to provide a low-cost computer solution that satisfies a specific "appliance"-like need for consumers.

Significant problems with many current computer offerings include unwieldy system configurations and inconvenient, uncomfortable form factors:, which may be defined as the size, shape, weight, and other physical features in the user-oriented portion of the computer system. Desktop computers are typically heavy multi-unit, cable-connected systems that occupy a significant portion of a desktop. Likewise, even laptop computers typically require a flat and steady support surface and cables for connecting to a telephone line, a printer, an external monitor, a full-size keyboard, or a mouse. Such approaches to extensibility, modularity, and interconnectivity sacrifice the convenience and mobility desirable in a home or office computer appliance. Consequently, a need exists for system configurations and form factors that overcome these limitations. Preferably, such devices are highly mobile and ergonomically designed to be operated on users' laps or other variable work surfaces.

Reliability is crucial to a computer's acceptance as a home appliance. For instance, refrigerators and telephones typically perform reliably for years with little or no maintenance. In contrast, computers are famous for "crashing", for difficult installations and repairs, and for immediate obsolescence. Furthermore, replacing or upgrading a computer is typically an expensive and time-consuming proposition. Moreover, even less robust appliances, like toasters, are priced to make replacement of the entire appliance a reasonable resolution to a maintenance problem. As such, a need exists for a computer appliance that limits reliability problems, allows simple, inexpensive, and reliable upgrades, and contains low-cost components to allow cost-effective replacement of the system and/or components when necessary.

Complexity issues concerning a computer appliance are also associated with reliability. Modern personal computers typically boast various upgradable hardware and software features that may require considerable effort by the consumer to implement. The costs of such extensibility include incompatibilities among hardware and software components, improper installations, and user frustration. Accordingly, a need exists for a computer appliance that performs its function and provides extensibility with minimal consumer involvement.

Part of the tension between the computer appliance concept and the current computer paradigm is caused by the traditional notion of having a computer be everything a user could want, including, for example, a business computing platform, a personal finance platform, a word processing platform, a graphics and design platform, a 3-D gaming platform, and so on. Such breadth of application amplifies each of the previously discussed problems. System features required to perform one set of functions are often unnecessary to perform another set of functions. In contrast, the appliance concept avoids such an expansive purpose for computer appliance use. Computer appliances may be designed to perform a focused set of functions with simplicity, reliability, and convenience at a reasonable cost. As such, a need exists for a computer appliance satisfying a common and focused set of consumer needs.

BRIEF SUMMARY OF THE INVENTION

It is therefore an object of the present invention to provide a modular computer appliance that has an ergonomically efficient form factor and configuration and provides access to a communications network.

It is another object of the present invention to provide a housing for a computer system that provides an ergonomic structure and facilitates mobility of the system.

It is another object of the present invention to provide a modular computer system having wireless communication interfaces to a base unit or other peripheral device.

Additional objects, advantages, and novel features of the invention are set forth in the description that follows and will become more apparent to those skilled in the art when taken in conjunction with the accompanying drawings. The objects and advantages of the invention may be realized and attained by means of the instrumentalities and accommodations particularly pointed out in the appended claims.

An improved modular computer apparatus in accordance with the present invention overcomes the disadvantages and limitations identified in the related art. A focused selection of features and components provides a cost-effective computer appliance. The roughly tablet-shaped form factor and wireless configuration greatly enhances usability. The sealed housing, combined with minimal maintenance features and nearly automatic upgrades, greatly improve reliability and decrease complexity. A computer appliance is directed to provide a set of focused applications for home and office coupled with wireless communication capabilities to a communications network.

An apparatus in accordance with the present invention comprises a housing for a modular computer appliance, a base unit capable of providing power to the computer system and capable of holding the computer appliance steady in an upright position, and a modular keyboard storable in the base unit. A tablet computer is housed in a case having at least one handle to allow a user to hold the computer system while viewing a display screen therein. A base unit has a keyboard guide to raise the keyboard above a support surface when inserted into the base unit. A keyboard guide engages the keyboard, when inserted, to provide resistance against unintended removal. A computer appliance provides wireless communications with the base unit and other peripheral devices. A base unit provides communication between the computer appliance and an external communications network.

BRIEF DESCRIPTION OF THE DRAWINGS

FIG. 1 depicts a front perspective view of a computer system in accordance with the present invention.

FIG. 2 depicts a rear perspective view of a computer system in accordance with the present invention

FIG. 6 depicts a perspective front view of a computer tablet separate from a base unit.

FIG. 7 depicts a top view of a base unit in accordance with the present invention.

FIG. 10 depicts a front, bottom view of an alternate tablet computer embodiment in accordance with the present invention.

FIG. 11 depicts a back, bottom view of an alternate tablet computer embodiment in accordance with the present invention, with the adapter module removed.

FIG. 15A depicts a front view of a keyboard in accordance with the present invention.

FIG. 15B depicts a bottom view of a keyboard in accordance with the present invention.

FIG. 17 depicts an alternate system embodiment of the tablet computer system in accordance with the present invention.

FIGS. 18A, 18B, and 18C depict an alternate embodiment of the present invention adapted to mounting below a horizontal surface.

FIGS. 19A, 19B, and 19C depict an alternate embodiment of the present invention adapted to mounting upon or against a vertical surface.

DETAILED DESCRIPTION OF THE INVENTION

Figure 3:
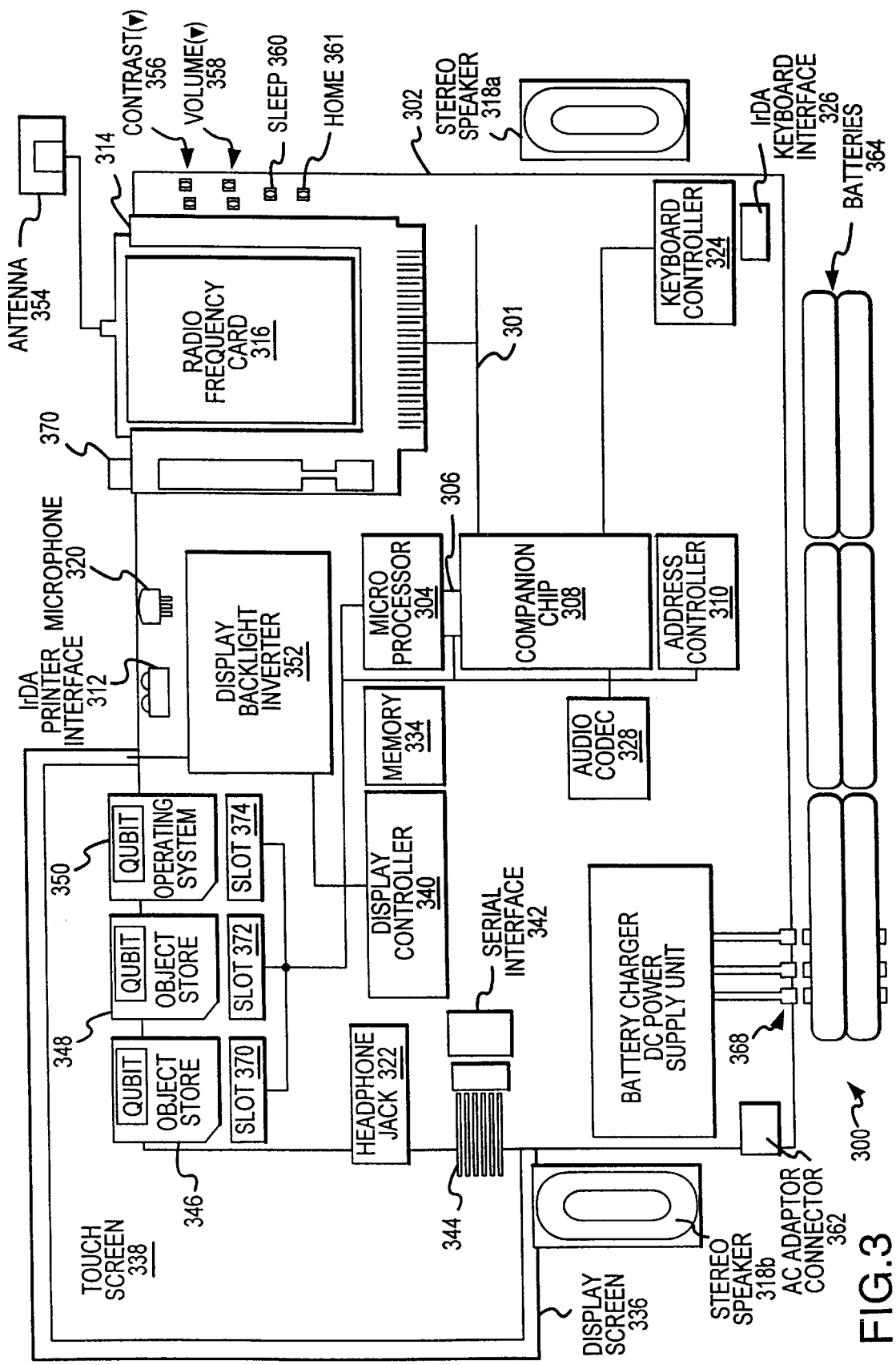
FIG. 3 is a system diagram of a tablet computer system in accordance with the present invention.

FIG. 1 illustrates a modular tablet computer, shown generally at 100, comprising tablet computer system 102, cradle unit or base unit 104, and keyboard unit 106. Tablet computer system 102, enclosed by a tablet-shaped case, is held steady in an upright position as it rests in support interface 110. A first portion of support interface 110 is formed in the lower edge of the case (called the "case support interface" or the "tablet support interface"), and a second portion of support interface 110 is formed in the base unit (called the "base support interface"). The two portions are complementary and mate to form a firm support holding tablet computer system 102 steady in an upright position. In an exemplary embodiment of the present invention, the case support interface forms a "tab" to mate into the "slot" of the base support interface. Although tablet computer system 102 in FIG. 1 illustrates a generally rectangular box or tablet, other shapes and aspect ratios are contemplated in accordance with the present invention, including square, circular, triangular boxes, and other shapes supporting a viewable display unit.

In the illustrated embodiment, the case is partially formed from a plastic casing comparable in composition to the plastic of typical personal computer. In an alternate embodiment, however, the case is formed, at least in part, from a softer foam rubber or plastic, such as that used in automobile dashboards, preferably with a hard plastic internal ribbing or frame. The softer casing provides adequate structural support while absorbing more impact (from a drop from a table, for example) than a typical hard plastic casing. The softer foam also provides improved comfort for a user holding the tablet in his or her hand or lap.

Tablet computer system 102 may be described as having front panel or face 124, back panel or face (200 in FIG. 2), top side 126, bottom side 128, left side 132, and right side 130. The descriptor "horizontal" refers to a dimension directed across front panel 124 from left side 132 to right side 130. The descriptor "vertical" refers to a dimension directed across front panel 124 from bottom side 128 to top side 126. The descriptor "axial" refers to a dimension directed normal to front panel 124. A "horizontal axis" is defined to extend horizontally across the vertical center of tablet computer system 102. A "vertical axis" is defined to extend vertically across the horizontal center of the tablet computer system 102.

The case is also substantially sealed to resist liquid and dust from entering the case. For example, display screen 118 is operably attached to the case by a gasket that substantially surrounds the entire perimeter of the viewable display screen. The gasket seals the display screen/case junction and provides improved shock resistance compared to other display screen cushioning that is merely positioned at the corners of the display screen. In addition, speakers 120a and 120b comprise speaker cones surrounded by sanaprene or other equivalent material. The cones themselves may be made of paper, mylar, or other flexible (i.e., vibratable) material. This combination resists foreign materials from penetrating through the speaker holes into the case to contact the internal system components. Microphone 122 possesses a similar configuration. Each infrared communication port 112 is covered by a translucent tinted plastic cap, which is heat staked to the port to integrally cap the port, thereby preventing ingress of foreign materials.

Furthermore, the case preferably comprises two main panel sections (front and back) that are brought together to enclose the internal tablet computer system components. The perimeter of the tablet computer is formed by the engagement of these panel sections, which forms a labyrinth seal to resist penetration by foreign materials. In addition, other ports, such as buttons apertures (e.g., 150, 152, 154, and 156), AC adapter port 220 and On/Off switch 222 in FIG. 2, and power supply port 602 in FIG. 6 are sealed by gaskets to resist penetration by foreign materials.

Infrared communications port 112 is an aperture positioned on the top side 126 of tablet computer system 102 to communicate with a printer or other peripheral located substantially in the line of sight therewith, particularly peripheral devices lacking an unobscured line-of-sight to an infrared port positioned on the front panel 124 of tablet computer system 102, such as second infrared port 114. A preferred infrared communications interface complies with the IrDA Serial Infrared Data Link Standard Specifications, available from the Infrared Data Association (IrDA) web site (www.irda.com). Other wireless communication devices, such as radio frequency devices, may be also used to communicate with remote peripherals within the scope of the present invention.

A second infrared port 114 is positioned in the lower portion of front panel 124 to communicate with keyboard 106 when keyboard 106 is removed from base unit 104 and tablet computer system 102 is held in an upright position, as shown. A corresponding infrared port (see, for example, infrared port 1506 in FIG. 15) is positioned on keyboard 106 to communicate with second infrared port 114 as a user types on keyboard 106 and views display unit 118. Other wireless communication devices, such as radio frequency devices, may be also used to communicate with a remote keyboard or other input device (such as a mouse or touch pad) within the scope of the present invention.

Dual stereo speakers 120a and 120b are positioned on either side of display unit 118 on tablet computer system 102. Microphone 122 is positioned at the top of front panel 124 to receive audio input from a user. Button 150 is a two-position rocker switch for controlling the brightness of the screen. Button 152 is a two-position rocker switch for controlling the volume of sound output through the speakers 102a and 120b.

Button 154 is a pushbutton that puts tablet computer system 102 in and out of a "sleep" mode, which powers down portions of the computer system to conserve power. In an exemplary embodiment of the present invention, depressing button 154 generates an interrupt received by a microprocessor of table computer system 102, which causes the power management system to toggle the "sleep" mode of the system. Another embodiment causes a Windows message to be generated for the purpose of causing the system to enter a "sleep" mode.

Button 156 is a pushbutton that causes a web browser executing on the tablet computer system 102 to go to the user's designated home page. In an exemplary embodiment of the present invention, depressing button 156 generates an interrupt that is received by a microprocessor within table computer system 102. The interrupt is processed by an interrupt handling circuit or program, which causes an message to be issued to cause the web browser to return to a predetermined home page.

Display unit 118 is viewable through a see-through portion covering greater than or equal to 50% of front panel 124. Furthermore, display unit 118 is large enough to support an onscreen keyboard operated by a user's fingers or other apparatus capable of pressing points on display unit 118. A touch screen (positioned adjacent to display unit 118) senses the duration and location of such touches and communicates touch events to an onscreen keyboard or other input application executing on tablet computer system 102.

Base unit 104 has keyboard receptacle 134 to store keyboard 106. Guide grooves, 136a and 136b, are formed in lower shelf 138 of receptacle 134 to guide keyboard 106 smoothly into receptacle 134. Complementary knobs (not shown) extend from the bottom of keyboard 106 to fit into guide grooves 136a and 136b. Top shelf 140 of base unit 104 extends over the keys (not shown) of keyboard 106, thereby protecting keyboard 106 from inadvertent key presses, household spills, and other interference. Base unit 104 also has support interface 110 to receive tablet computer system 102 and hold it steady in an upright position, as shown.

FIG. 2 depicts a rear view of an embodiment in accordance with the present invention. The case has grips 204a and 204b extending substantially parallel to the tablet sides 130 and 132. In this illustration, the grips comprise curved recesses or grooves in the back panel 200 of tablet computer system 102. In combination with other structures of tablet computer system 102, each grip forms a handle at one side of tablet computer system 102. Specifically, a user grasps a side of tablet computer system 102 with the palm of the user's hand contacting the side surface (e.g., 132) of the tablet computer system 102, a thumb or palm portion of the user's hand contacting the front surface (e.g., 116 of FIG. 1) of the front panel of tablet computer system 102, and one or more fingers contacting the grip (e.g., 204b). In this manner, a user can support the tablet computer system 102 by one hand with front panel 124 facing upward, while the user's second hand provides input to the computer system, such as by pressing keys on a display screen keyboard (not shown).

While FIG. 2 depicts a specific handle configuration in tablet computer system 102, other handle configurations are contemplated in accordance with the present invention, including a handle on one side, handles on two sides, and a handle or handles positioned at the top and/or bottom sides. Moreover, a handle may comprise a grip that is completely recessed through the case so as to create a handle bar for the user to grip, wherein at least one finger of the hand engages the grip to allow the user's hand to wrap around the bar. Likewise, in an alternate embodiment, the grip may protrude from, rather than recess into, the back panel. Such a protruding grip may comprise a structure integrally formed in the back panel, adhered to the back panel, or other wise affixed to the back panel.

Infrared port 112, positioned at the top side of tablet computer system 102, is oriented to communicate with a nearby printer or other peripheral device. Port 220 is capable of receiving a connector to a wired keyboard. Power switch 222 is a two-position rocker switch that toggles the power to tablet computer system 102.

Base unit 104 has curved top surface 206 positioned behind support interface 110. The curved shape enhances support to the horizontal center of tablet computer system 102 when tablet computer system 102 is resting in the cradle or slot of support interface 110. Back panel 208 of base unit 104 has an on/off switch 210 protruding therefrom. Jacks 212 and 214, preferably RJ-11 or RJ-45 jacks, are accessible from back panel 208. Jack 212 receives a service line connector (typically from a telephone outlet) to provide wired communications service from a communications service provider. Jack 214 receives a connection from a telephone to provide a wired connection between the telephone (not shown) and a communications service provider, , through base unit 208. Power cable 216 connects to AC adapter port 218 to provide electrical power to base unit 208.

The base unit 208 is sealed to prevent or to minimize the amount of material entering the base unit 208. Base unit 208 is formed by two plastic halves that form a labyrinth seal when attached together to form the complete base unit case.

Furthermore, switch 210, and ports 218, 212, and 208 include gaskets to resist the penetration of foreign material.

Figure 4:
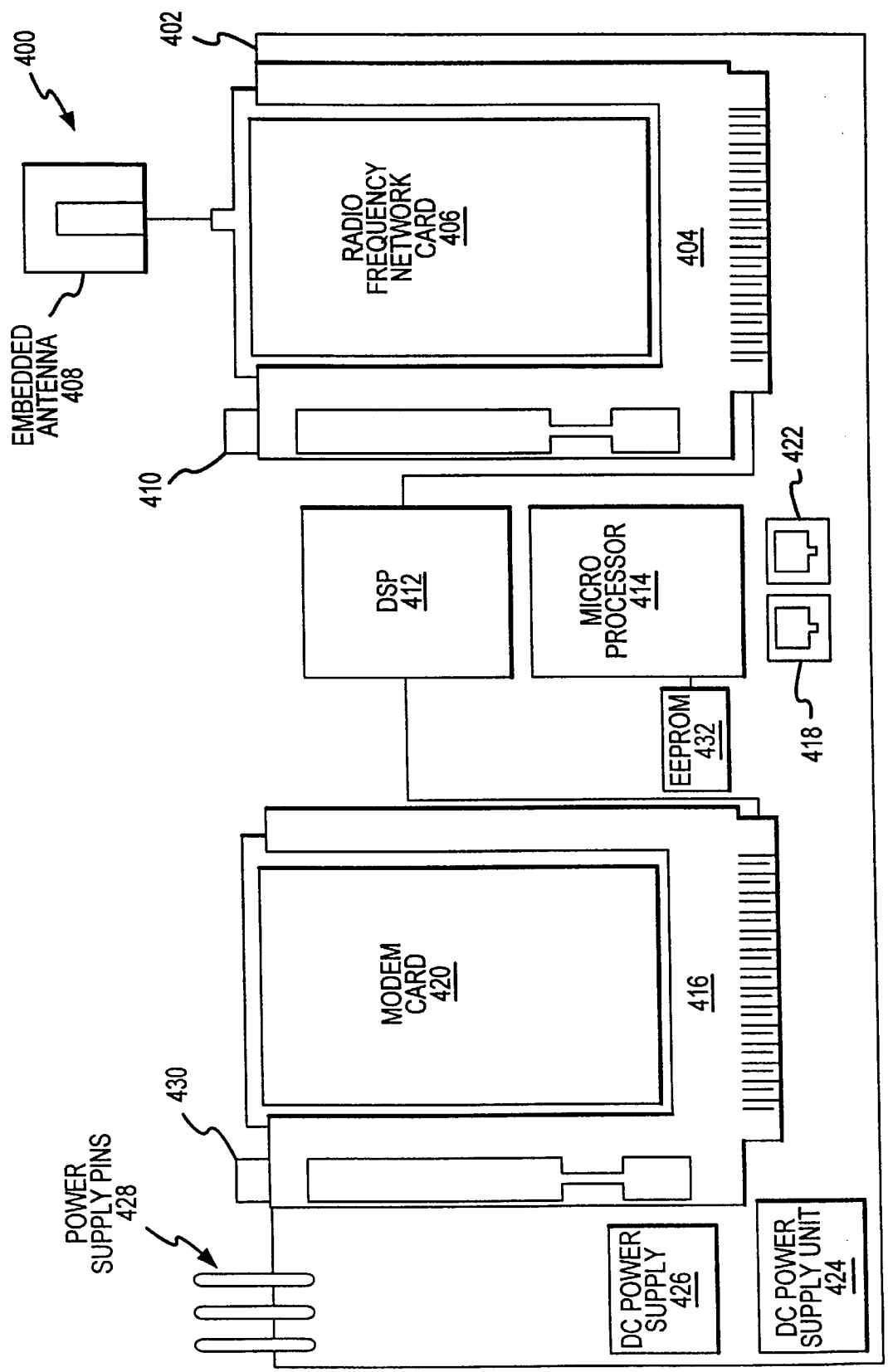
FIG. 4 is a system diagram of the electronic components of a base unit.

FIG. 3 depicts a block diagram of a tablet computer system in accordance with the present invention. In an exemplary embodiment, a computer system 300 executes an operating system, such as Microsoft Windows 98 or Microsoft Windows CE, to support one or more software applications. Computer system 300 can operate as a stand-alone computer system possessing necessary input/output interfaces and internal system components to implement a wide variety of computer applications. In addition, computer system 300 can communicate with a base unit (as shown in FIG. 4) to access a communications network, such as a LAN, WAN, an Internet, an Intranet, or an Extranet. In this manner, computer system 300 can access other computer systems and peripherals.

Motherboard 302 supports a wide variety of the system components, many of which are (mechanically or chemically, for example) attached to motherboard 302. Preferably, many system components are soldered to motherboard 302 (such as with surface mount components). Other system components are operably attached to the tablet computer case, such as batteries 364. Microprocessor 304 is operably attached to motherboard 302. Companion chip 308 or an appropriate chipset is coupled to microprocessor 304 by data bus 306 and address bus 310. Companion chip 308 provides functionality for a FIR (Fast InfraRed) interface. In an exemplary embodiment, the FIR interface is coupled to IrDA printer interface 312 and an IrDA keyboard interface to provide wireless communications to a remote printer, a remote keyboard, or other peripherals. Companion chip 308 also provides functionality for a PCMCIA Card Interface supporting a PCMCIA slot. Alternately, companion chip 308 may also support an ISA interface for a IOMEGA's Clik storage medium and other removable storage media. A PCMCIA card interface in companion ship 308 is coupled to PCMCIA slot 314, which in a preferred embodiment receives a 2.4 Ghz frequency hopping spread spectrum radio frequency network adapter in Type II PCMCIA format.

Companion chip 308 also provides a two channel UART (Universal Asynchronous Receiver/Transmitter), and an audio codec (encoder/decoder) for supporting speakers 318a and 318b and microphone 320. Audio codec 328 is also coupled to companion chip 308 and encodes/decodes signals to stereo speakers 318a and 318b and headphone jack 322 and from microphone 320. Audio codec 328 is used to process a stereo signal for stereo speakers 318a and 318b. Audio output can also be routed to headphone jack 322.

Figure 5:
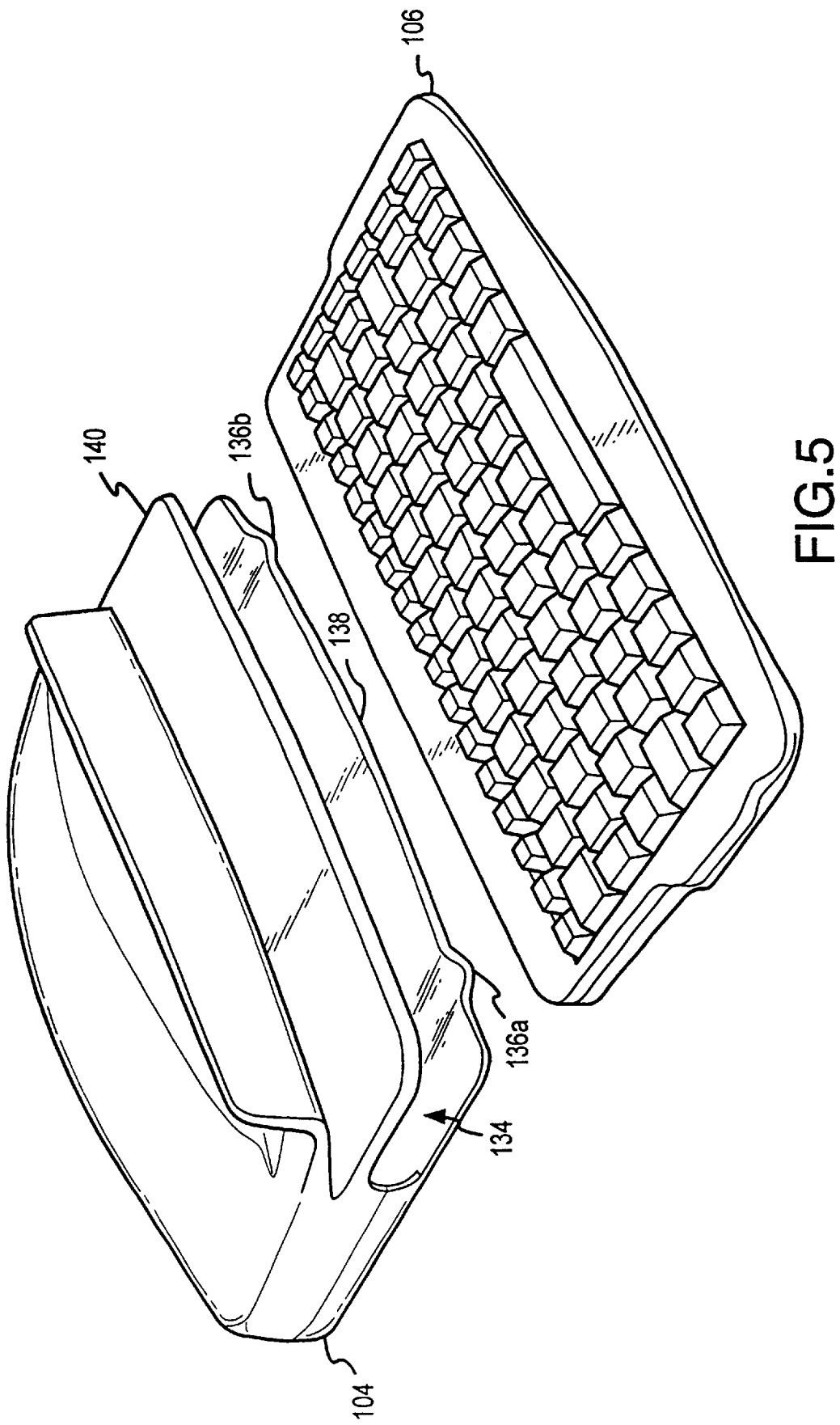
FIG. 5 depicts a perspective view of a base unit with a keyboard removed from its receptacle.

Companion chip 308 also supports an analog front end interface and a Universal Serial Bus (USB) interface. IrDA keyboard controller 324 is coupled to the 8-bit keyboard interface in companion chip 308. IrDA keyboard interface 326 is coupled to IrDA keyboard controller 324 and is oriented to communicate in a direction generally axial to motherboard 302, directed outward from the front panel (124 in FIG. 1). Furthermore, IrDA keyboard interface 326 is positioned in the lower quadrant of motherboard 302 to optimize communications between a wireless keyboard (not shown) positioned to face the front panel of tablet computer 300. Typically, such keyboard is used when tablet computer 300 is positioned upright in a support interface of a base unit, such as shown in FIG. 5. Therefore, by positioning IrDA keyboard interface 326 in the lower quadrant of the front panel of tablet computer 300, communications with the wireless keyboard sitting below the display unit are optimized.

In contrast, IrDA printer interface 312 is positioned near the top of tablet computer 300 and directed to communicate out the top side of tablet computer 300. The orientation of IrDA printer interface 312 is set to optimize wireless communications with an IrDA printer or other IrDA peripheral positioned in the general vicinity of tablet computer 300, but having a line of sight obscured from the front panel of the tablet computer. Memory 334 is coupled to microprocessor 304 and is capable of supporting system memory, cache memory, and Read-Only Memory (ROM) for storing configuration and BIOS information.

In an embodiment of the present invention, display 336 is a 12.1 inch SuperVGA LCD display supporting 800×600 resolution. Display 336 is coupled to video controller 340, such as a SMOSS/Epson 1355 or a Chips & Technologies 65555, which drives the video displayed by display 336. Display backlight inverter 352 provides backlighting for the LCD display. Touch screen 338 receives input from a user by pressure applied to the screen. With the addition of an appropriate software application, other input means are possible including voice recognition and handwriting recognition. In an embodiment, touch screen 338 is a Microtouch 5-wire Resistive Touch Screen. Touch screen controller 342 is a serial interface controlling touch screen 338, and in an embodiment, is a Tritech touch screen controller TR88L805 serial interface. Touch screen 338 is coupled to touch screen controller 342 via cable 344.

Object stores 346, 348, and 350 are removably attached to slots 370, 372, and 374. Each are capable of storing operating system code, application code, personality data on the user, and other data usable by the tablet computer system.

Antenna 354 is coupled to a wireless communication device, such as radio frequency adapter 316, for communication with a corresponding wireless communication adapter in a base unit (not shown). Contrast buttons, shown generally at 356, are coupled to the display 336 and video controller 340 to control the contrast of the screen. Likewise, volume buttons shown generally at 358, are coupled to audio codec 328 and the audio codec in companion chip 308, to control the volume of the speakers. Sleep button 360 is coupled to microprocessor 304 and initiates a sleep mode to minimize the power use of the tablet when the tablet computer is not in use.

AC adapter connector 362 is capable of receiving a connector from an AC adapter to receive auxiliary power for running tablet computer 300 or for charging batteries 364. Batteries 364, disposed in a detachable power module, are coupled to battery charger 366 and provide mobile power to tablet computer system 300. In an embodiment of the present invention, tablet computer system 300 requires lithium ion batteries. In an alternate embodiment, four Nickel Metal Hydride batteries (AAA cells) may be used. The characteristics of the battery charger 366 must correspond to the type of battery used. Also coupled to battery charger 366 is a two-pin power lead that protrudes through a port in the case (not shown) of tablet computer system 300. In an alternate embodiment, a detachable power adapter module may contain a power coupling from an external power source, one or more storage devices, and various external interfaces, including additional adapter slots (such as PCI or PCMCIA slots), a USB interface, serial and parallel interfaces, SCSI interfaces, and mouse and keyboard ports.

The system components of tablet computer system 102, including the case, are configured to optimize the weight distribution of the tablet computer system 102. Accordingly, in an embodiment of the present invention, a majority (50% or greater) of the weight of tablet computer 102 is distributed in the lower half of the tablet computer 102, and preferably distributed in the lower one-third of the computer tablet 102. Specifically, the placement of batteries 364 result in the majority of the weight of tablet computer system 102 being positioned in the lower half of the tablet. Likewise, the system components are positioned to distribute the weight of the tablet computer system substantially symmetrically about the central vertical axis of the tablet computer. Such symmetry is achieved within the necessary tolerances such that the tablet computer can easily balance on a user's leg, forearm, or other support service positioned about the vertical axis of tablet computer 102. Moreover, the majority of the tablet computer's weight is preferably distributed horizontally in the center four-fifths of the tablet computer about the vertical axis, and preferably in the center two-thirds.

FIG. 4 depicts a block diagram of a base unit in accordance with the present invention. Printed circuit board 402 supports system components to perform wireless communications with a tablet computer (see, for example, tablet computer 300 in FIG. 3) and to perform communications with a communications network. PCMCIA slot 404 receives a standard Type II PCMCIA card capable of performing wireless communication with a tablet computer. In both the tablet computer and the base unit 400, the corresponding communication devices may be removed and replaced with newer technology, although to provide communications between the base unit and the tablet computer, the PCMCIA wireless device 406 must provide a compatible communication technology to that of the tablet computer. For example, in an embodiment illustrated in FIG. 4, base unit 400 supports, in PCMCIA slot 404 a 2.4 GHz frequency hopping spread spectrum radio frequency adapter card 406 for wireless communication to the tablet computer. Correspondingly, a compatible 2.4 GHz frequency hopping spread spectrum radio frequency adapter card (not shown) is required in the tablet computer to establish the wireless communication link there between.

The relative bandwidths of the wireless communications link between the tablet computer and the base unit and the wired communications link between the base unit and the service provider are balanced to reduce a data bottleneck in the system. For example, if the wired connection is embodied by a typical 56 Kbps modem, then the 2.4 GHz frequency hopping spread spectrum radio frequency link (having a maximum bandwidth of approximately 2 Mbps) is adequate. Alternately, if the wired connection is a DSL link (having a maximum bandwidth of approximately 1.5 Mbps), the wireless link can be upgraded to make maximum utilization of the wired connections bandwidth. For example, a DSL connection to a service provided could be balanced with a higher bandwidth wireless connection between the tablet computer and the base unit, thereby preventing a bottleneck in the wireless communication portion of the link to the communications service provider.

Antenna 408 is coupled to adapter card 406 and is disposed within the case (not shown) of base unit 400. Mechanism 410, when pushed, can cause an inserted PCMCIA card 406 to be ejected, although this mechanism is disabled in an embodiment of the present invention because the slot is fully enclosed in the tablet case.

Digital signal processing (DSP) chip 412 and microprocessor 414 are coupled to PCMCIA slots 404 and 416 via a bus interface, such as a PCI, ISA, or PCMCIA interface. EEPROM 432 contains driver code and data required to initialize and operate the modem card 420 and network card 406. In an alternate embodiment, a DSP chip performs all control of the base unit, and the microprocessor is not needed.

Jack 418 is coupled to PCMCIA adapter 420 to receive a communications service line (not shown) from a communication service provider. In an embodiment, jack 418 is an R-11 jack coupled to an external communications interface, such as a PCMCIA modem adapter card 420. The external communications interface is disposed within the base unit and provides communication with an external network. In an alternate embodiment, PCMCIA adapter card 420 may support Digital Subscriber Line (DSL) technology, Integrated Digital Services Network (ISDN) technology, or other wired communications technology. Alternately, PCMCIA card 420 may be a PCMCIA network adapter card, such as a 100 MBit Ethernet adapter for connecting to a LAN, or an additional wireless communication interface. Accordingly, jack 418 could be an RJ-45 jack, a coaxial cable connector, or other network cable connector. Jack 422, in an embodiment, is an RJ-11 jack for connecting the base unit 400 to a telephone. This interface allows a parallel connection between the telephone base unit and telephone jack to a service provider.

AC adapter 426 is a power supply unit providing power to the base unit 400. Furthermore, AC adapter 426 is coupled to a two-pin power lead 428 that protrudes from a power supply port in the base unit to allow contact with a corresponding power supply lead in a tablet computer system. Assuming the base unit is powered by an external power source, if the two pin power lead of the base unit contacts the two pin power lead in a tablet computer, AC adapter 426 provides power to tablet power supply unit 366 (in FIG. 3). AC adapter 426 is also coupled to AC adapter interface 424, which receives a connector from an external AC source (not shown). Mechanism 430, when pushed, causes an inserted PCMCIA card 420 to be ejected.

FIG. 5 depicts a base unit 104 with removed keyboard 106. Top shelf portion 140 forms the top portion of keyboard receptacle 134, which is configured to receive and align keyboard 106 into the receptacle. Alignment is achieved, in part, by bulges, not shown, located at the bottom of keyboard 106 to slide into guide grooves 136a and 136b.

In an embodiment of the present invention, there is no wired data connection between keyboard 106 and base unit 102, or between keyboard 106 and tablet computer system 102. A wireless data connection is established between keyboard 106 and the tablet computer system 102 using an IrDA interface, although other wireless interfaces, including a radio frequency interface, are in accordance with the present invention. Other embodiments, however, may provide an alternate wired data connection among these components, such as a power/data wire connecting the keyboard 106 to base unit 102. Likewise, a wireless data connection is established between base unit 104 and the tablet computer system 102 using a radio frequency interface, although other wireless interfaces, including an IrDA interface, are in accordance with the present invention. The radio frequency interface is preferable due to the bandwidth balancing required to avoid a bottleneck when the wired connection to the service provider is a high-speed modem.

FIG. 6 shows tablet computer system 102. Recessed guide 600 is formed in front panel 124 of tablet computer system 102 and assists in aligning case power supply port 602 in contact with a corresponding base unit power supply port (700 in FIG. 7). As recessed guide 600 descends into the base portion of support interface 110, the front tab 142 of the base unit's support interface matches into recessed guide 600 and slides to align tablet computer system 102 into a repeatable position in the base unit's support interface slot. Likewise, the grooves of grips 204a and 204b formed in back panel 200 of tablet computer system 102 also slide to mate with complementary guides (702a and 702b in FIG. 7) in the back wall of the base unit's support interface.

FIG. 7 depicts a view of base unit 104 having a curved top surface 206, a keyboard receptacle 134, and Support interface 110 generally comprises three surfaces, those being front tab 142, support surface 704, and back wall 706. Front tab 142 extends upward from base unit 104 to mate with the recessed guide in the front panel of the tablet computer. The perimeter of front tab 142 is configured with sloping sides 708a and 708b to assist in the horizontal alignment of the power supply contacts of both the tablet computer system and base unit 104. Support surface 704 receives the bottom side of tablet computer system 102, supporting the weight thereof. The length of support surface 704 extends horizontally to substantially meet with the horizontal length of the bottom side of tablet computer system. Back wall 706 extends upward from support surface 704 to the edge 710 of curved top surface 206 and tilts slightly toward the back panel of base unit 104 to provide a slight upward tilt of the display unit to facilitate viewing by a user. Guides 702a and 702b are positioned at each side of back wall 706 to mate with the grip grooves of the tablet computer system. As such, the structure of the support interface 110 allows the tablet computer to be placed therein in a manner similar to a telephone handset being placed in a telephone cradle while providing a weight supporting surface, horizontal alignment, and front and back support to hold the tablet computer steady in an upright position.

Figure 8:
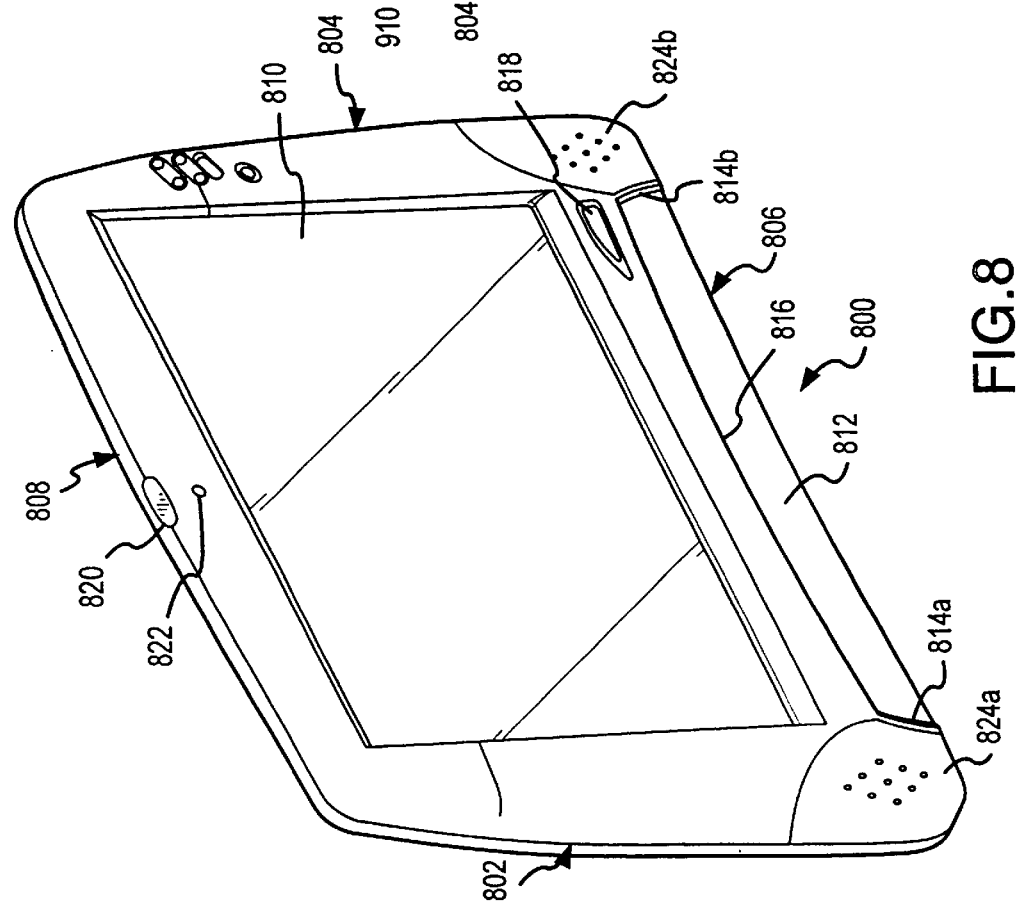
FIG. 8 depicts a front view of an alternate tablet computer embodiment in accordance with the present invention.

FIG. 8 illustrates a front view of an alternate embodiment of the tablet computer system. Tablet computer 800 is generally rectangular, having left side 802 and right side 804 that slope slightly toward the horizontal center of tablet computer 800, such that bottom side 806 is longer than top side 808. Display screen 810 is substantially centered horizontally in the front panel of tablet computer 800.

A support interface is located along the bottom side of computer table 800 and includes recessed area 812 surrounded by an interface lip having sloping lip portions 814a and 814b, and horizontal lip portion 816. These interface lips, particularly the sloping lip portions 814a and 814b, comprise a case guide to mate against a base unit guide for providing horizontal alignment as tablet computer 800 is inserted into a base unit (see FIG. 1). The support interface forms a tab that fits into a complementary, slot-like support interface in the base unit. In the illustrated embodiment, there is no data communication connection because the support interface is substantially comprised of a non-conducting material.

Furthermore, an electrical connection is provided between a computer power lead and a base unit power lead, but no data communication between the tablet computer and the base unit is provided by this interface. Instead, all data communications is accomplished by wireless means in the illustrated embodiment. Other complementary support interface configurations are also contemplated by the present invention, including a non-conducting tab-like structure in a base unit that inserts into a slot-like structure in the tablet computer case.

Tablet computer 800 also includes IrDA port 818 positioned in the lower right portion of tablet computer 800 for communication with an IrDA input device, such as a keyboard or a mouse, located in front of and facing display unit 810. IrDA port 820 is positioned on the top side of tablet computer 800 for communication with a peripheral device, such as a printer, having a light-of-sight obscured from the front panel and IrDA port 818. In this configuration, IrDA port 820 can, for example, communicate with an IrDA peripheral device located behind (obscured from the IrDA port 818) or in front of tablet computer 800. An IrDA interface device (see the block diagrams of the tablet computer system in FIGS. 3 and 17) is operably attached to each IrDA port to perform the wireless communication through each port. Microphone 822 is positioned near the top of tablet computer 800. Speakers 824a and 824b are positioned preferably on the bottom left and right corners of the front panel of tablet computer 800.

Figure 9:
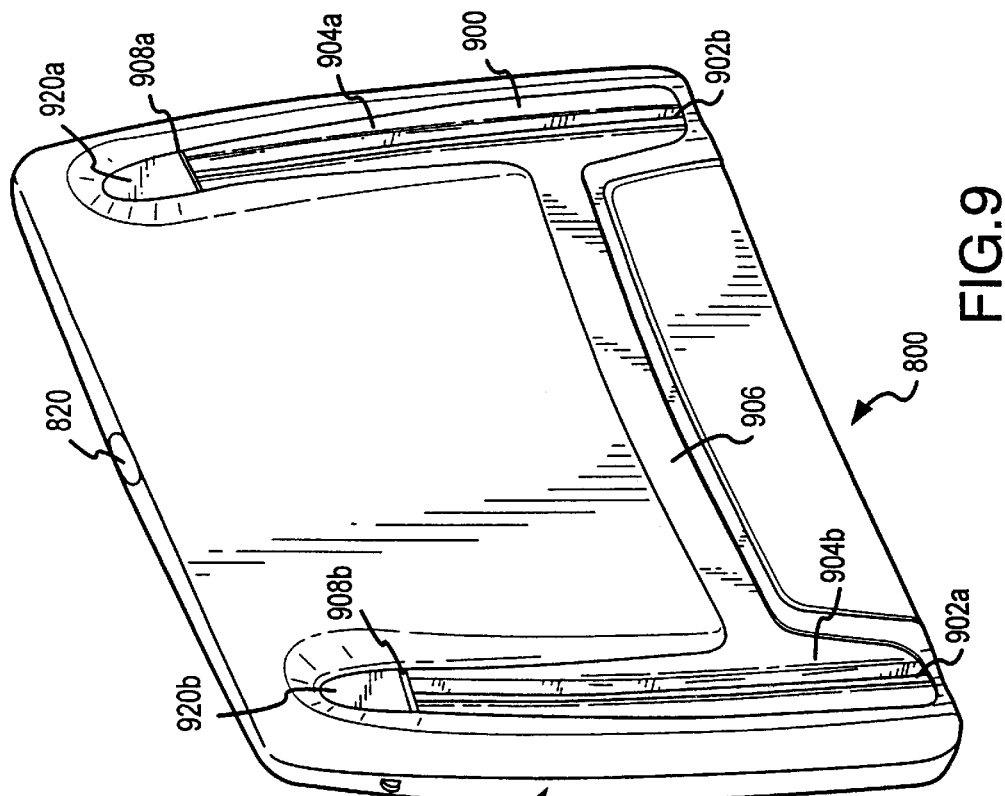
FIG. 9 depicts a back view of an alternate tablet computer embodiment in accordance with the present invention.

FIG. 9 depicts a rear view of the alternate embodiment of FIG. 8. Stand 900 is positioned in stand recess (at 902a and 902b) formed into the back panel of tablet computer 800 and is operably attached to tablet computer 800 by hinges 909a and 908b. When tablet computer 800 is being held by a user, stand 900 can be held into stand recess 902 such that stand 900 substantially become part of the back panel. In this configuration, stand 900 includes stand legs 904a and 904b and transverse support 906. Stand legs 904a and 904b each have a concavity extending substantially along the length of each leg. The concavity forms a portion of the grip of a handle along each side of tablet computer 800. In an alternate embodiment, stand 900 can be convex or provide some other protruding surface or feature to form a portion of each grip. In yet another alternate embodiment, stand 900 may not contribute to any portion of each grip. Hinges 908a and 908b allow stand 900 to fold out from the back panel of tablet computer 800 to provide an upright support against a support surface (see FIG. 12). Mini-stands 920a and 920b can also fold out to support tablet computer 800 (see FIG. 17). Both stand 900 and mini-stands 920a and 920b can be folded back against the back panel of tablet computer 800, and will remain approximately flush with the back panel until re-extended by the user.

The lower portions of the stand recess, shown at 902a and 902b, also provide a case guide to detachably engage a complementary base unit guide from a base unit (see FIG. 1). The lower portions of the stand recess also comprise the lower portions of the recessed grip in the illustrated embodiment. Accordingly, in an embodiment without a stand recess, the grip itself or any other case guide structure may engage a corresponding guide in a base unit to facilitate horizontal alignment of the tablet computer and base unit. As shown, the case guides at 902a and 902b are curved to provide horizontal alignment of tablet computer 800 as it slides onto the base unit.

IrDA port 820 is located in the top side of tablet computer 800 in FIG. 9. Scroll wheel 910 protrudes from right side 804 (from the front perspective) to allow a computer to operate scrolling capabilities of software executing on tablet computer 800. By rolling wheel 910 clockwise, tablet computer 800 receives input signals causing a scrollable view to scroll down. Likewise, by rolling wheel 910 counterclockwise, tablet computer 800 receives input signals causing a scrollable view to scroll up.

FIG. 10 depicts a top view of tablet computer 800. Two pin power lead 1000 is positioned on the bottom side of tablet computer 800 in the bottom side of adapter module 1002. Power lead 1000 is positioned to contact a two pin power lead, preferably having two "pogo-pin" contacts protruding from the base unit. Adapter module 1002 embodiments may include a battery pack or a interface module capable of containing elements such as an alternate power connection, a storage medium, and a variety of data connections, such as a high-speed network connection, a serial port, and a parallel port. In alternate embodiment, a third pin may be included in the power leads to provide proper grounding.

FIG. 11 depicts a bottom view of tablet computer 800 with the adapter module removed. The concavities in the stand legs 904a and 904b are shown generally at 1100a and 1100b, respectively. These concavities extend along the length of each leg to form a portion of a grip along each side of tablet computer 800. Connection 1102 receives a complementary connection from the removed adapter module to provide power to table computer 800. Connection 1102 is internal coupled to an AC adapter/recharger within tablet computer 800.

Figure 12:
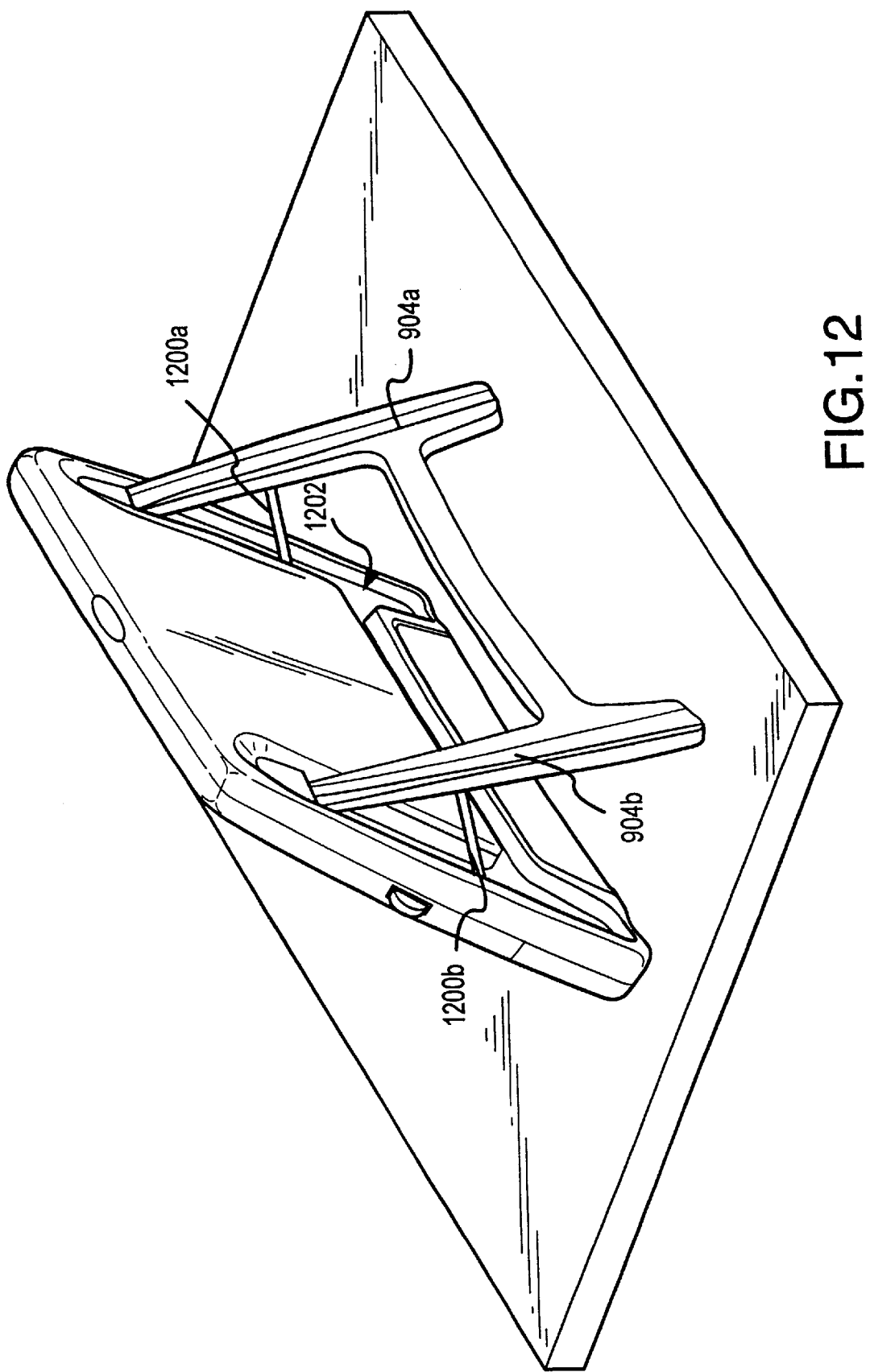
FIG. 12 depicts a back view of an alternate tablet computer embodiment in accordance with the present invention with a stand extended to support the tablet computer on a support surface.

FIG. 12 depicts stand 900 unfolded to extend from the back panel of tablet computer 800. Sliding supports 1200a and 1200b are operably attached at one end to stand legs 904a and 904b. The other end of each support is slidingly attached to a slot inside the stand recess 1202 (also shown in FIG. 9 at 902a and 902b).

Figure 13:
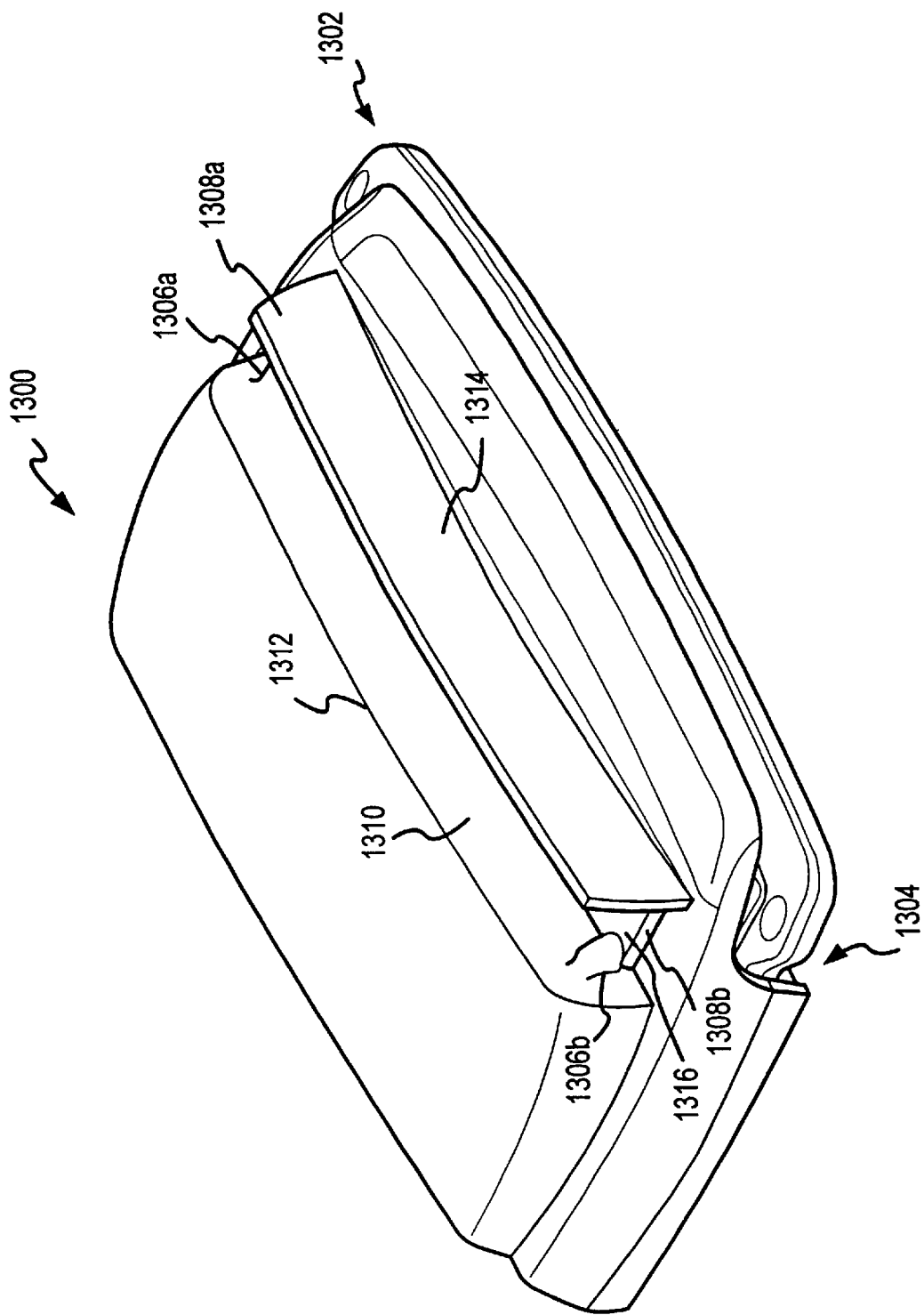
FIG. 13 depicts a top, front view of an alternate base unit embodiment in accordance with the present invention, with a keyboard inserted in a keyboard receptacle.

FIG. 13 depicts an alternate embodiment of base unit 1300 with keyboard 1302 inserted within keyboard receptacle 1304. In the illustrated embodiment, base unit guides 1306a, 1306b, 1308a, and 1308b are configured to mate against complementary guides in an inserted tablet computer (see, for example, FIGS. 1 and 2). Specifically, the guides at 1306a and 1306b mate against the lower portions of the stand recess (shown in FIG. 9), the lower portion of the grip (shown in FIG. 9), or some other case guide to assist in aligning the table computer with base unit 1300. Particularly, alignment of computer power supply port and base power supply port requires horizontal alignment of the two units.

To provide additional sturdiness and weight support, base unit 1300 also includes back wall 1310 and edge 1312 to engage the lower portion of the back panel of a tablet computer. Furthermore, the bottom side of a computer table rests upon support surface 1316, and the lower portion of the front panel of a tablet computer rests against the inside wall of tab 1314 (i.e., the wall that faces back wall 1310) to stabilize or steady the tablet computer in an upright position.

Figure 14:
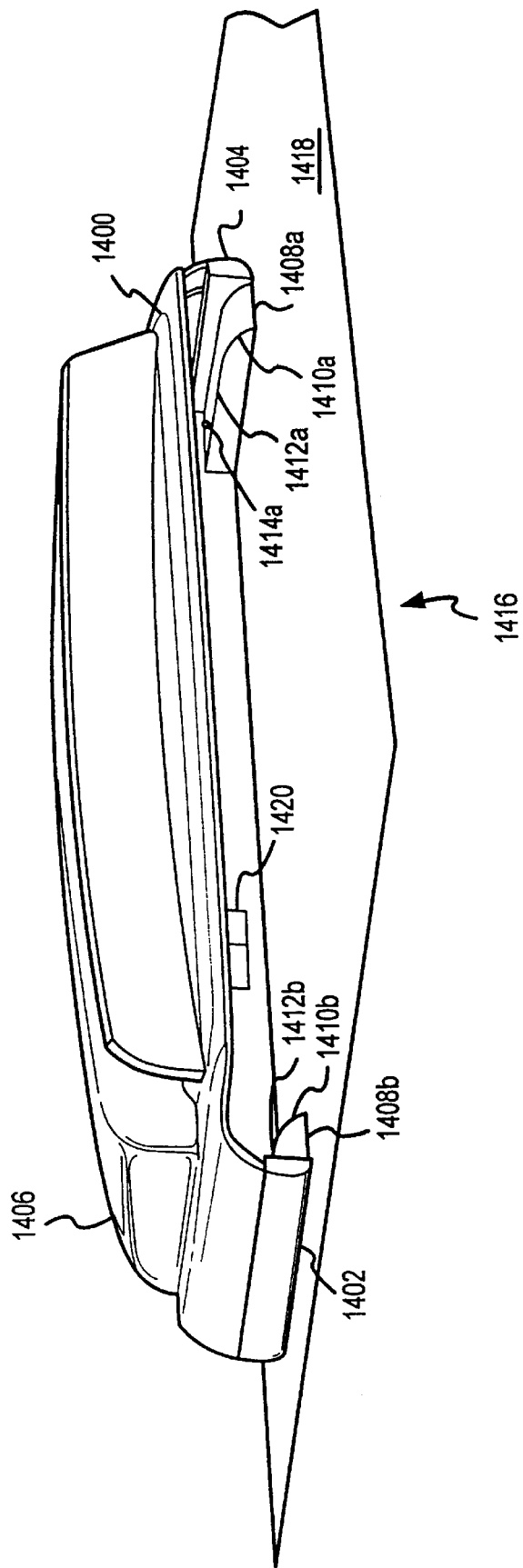
FIG. 14 depicts a bottom, front view of an alternate base union embodiment in accordance with the present invention, with a keyboard removed from the keyboard receptacle.

FIG. 14 depicts an embodiment of the base unit in accordance with tile present invention. In contrast to the base unit illustrated in FIG. 5, this embodiment lacks a lower shelf (see lower shelf 138 in FIG. 1 and FIG. 5). Instead, the base unit comprises a top shelf 1400, a left side portion 1402, a right side portion 1404, and a back portion 1406. The side portions include keyboard guides 1408a and 1408b having beveled ends 1410a and 1410b, slide portions 1412a and 1412b, and nipples 1414a and 1414b. A keyboard (not shown) may be inserted under top shelf 1400 by sliding the keyboard along support surface 1418 until the side rails of the keyboard (see 1502 in FIG. 15A) contact beveled ends 1410a and 1410b, at which point the keyboard raises above the support surface and onto slide portions 1412a and 1412b. This action occurs at both side portions 1412a and 1412b of the base unit and both side rails of the keyboard.

In an exemplary embodiment of the present invention, the keyboard side rails have a bevel to assist in engaging the bevel in the keyboard guides of the base unit. As the keyboard continues into keyboard receptacle 1416 along slide portions 1412a and 1412b, it eventually rides up over nipples 1414a and 1414b, respectively. When the keyboard is completely inserted into keyboard receptacle 1416, a detent in each keyboard side rail (see, for example, detent 1510a in side rail 15010a in FIG. 15B) slips over each of nipples 1414a and 1414b to detachably retain the keyboard within keyboard receptacle 1416. To remove the keyboard from keyboard receptacle 1416, a user can press on the two sides of the front of the keyboard to lift (or tilt) the detents from nipples 1414a and 1414b and pull the keyboard out along keyboard guides 1408a and 1408b. In an exemplary embodiment, keyboard receptacle also includes a receptacle power lead 1420 to contact corresponding keyboard power leads (see leads 1500 in FIG. 15A).

FIG. 15A depicts a front view of a keyboard embodiment in accordance with the present invention. Keyboard power leads 1500 are positioned to contact receptacle power leads (leads 1420 in FIG. 14) when the keyboard 1504 is fully inserted into the keyboard receptacle. Infrared communications port 1506 are positioned on the front side of keyboard 1504 to communicate with a corresponding infrared communications port on the front panel of a tablet computer. FIG. 15B depicts a bottom view of a keyboard embodiment in accordance with the present invention. Detents 1510a and 1510b are located on side rails 1502a and 1502b. Battery receptacle 1508 holds batteries that provide power to keyboard 1504 and to the internal infrared communications device operably attached to infrared communications port 1506 (in FIG. 15A).

Figure 16:
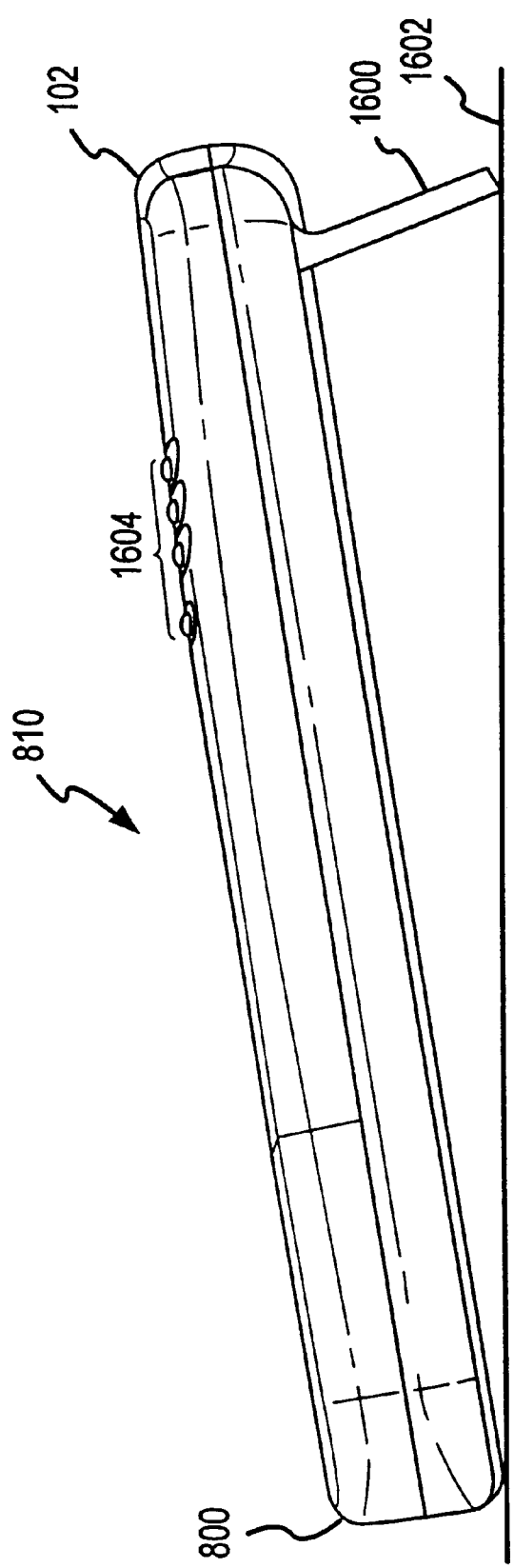
FIG. 16 depicts an alternate tablet computer embodiment in accordance with the present invention being supported by the mini-stands extended from the back panel of the tablet computer system.

FIG. 16 depicts tablet computer system 800 supported on support surface 1602 by the two mini-stands depicted in FIG. 9. Right mini-stand 1600 and left mini-stand (not shown) extend out from tablet computer system 800 to prop the display panel 810 toward a user. The mini-stands support the weight of tablet computer system 800 as well as additional force applied by a user when, for example, depressing buttons, shown generally at 1604, or touching the touch screen in display panel 810.

FIG. 17 depicts an alternate system embodiment of the table computer system in accordance with present invention. Batteries 1700 may provide power via two-prong power contact 1702 to battery charger 1704. Alternately, power can be provided externally via AC adapter connector 1706. Super VGA display screen 1710 is preferably a 12.1 "TFT or STN LCD display screen supporting 800×600 resolution. Display screen 1710 is preferably controlled by Color LCD Controller Chips & Technology 69000. Touchscreen 1708 is preferably a Microtouch 5 Wire Resistive Touchscreen. Touchscreen 1708 is preferably controlled by Tritech Touch Screen Controller TR88L805. Alternate configurations of display screen and touch screen are also contemplated within the scope of the present invention.

The embodiment illustrated in FIG. 17 has Cyrix Media GXm microprocessor 1712 preferably coupled to PCI bus 1714, Cyrix 5530 companion chip 1716, and 9 mm×2.5 Hard Disk Drive 1718. Alternately, an ISA bus is supported to connect to PCMCIA Interface or ISA Interface to PCMCIA Type II socket 1722, which receives radio frequency network adapter 1724. SDRAM modules 1726 are coupled to microprocessor 1712 by a data bus and an address bus (shown generally at 1728). Scroll wheel 1720 protrudes from the tablet computer case to allow a user to move scrollable windows by rotating scroll wheel 1720. Other illustrated components in FIG. 17 are similar to corresponding components in the embodiment depicted in FIG. 3.

FIGS. 18A, 18B, and 18C depict an alternate embodiment of the case, and base unit in accordance with the present invention. Base unit 1800 is suspended below a substantially horizontal surface. Tablet computer system 1802 fits into a guide slot 1804 in base unit 1802, supported by a guide drawer 1806. An interface portion of guide drawer 1806 has interface lip 1808 that engages with recessed area 1810 of tablet computer system 1802. Tablet computer system 1802 can be pulled out of guide slot 1804 on guide drawer 1806, which is connected to the sides of guide slot 1804 by flange 1814, pin 1812, and a slide mechanism (not shown) operably attached to the base unit. When extracted from guide slot 1804, tablet computer system 1802 and guide drawer 1806 rotate down to hold tablet computer system 1802 upright to be viewed by a user. The angle of tablet computer system 1802, when extracted, may be variable, controlled by a stop incorporated into the combination of flange 1814, pin 1812, and a slide mechanism. Tablet computer 1802 may be removed from guide drawer 1806 for mobile use, and replaced to the guide drawer 1806 for later storage. The drawer can be reinserted into guide slot 1804, with or without tablet computer system 1802. Guide drawer 1806 also provides power to tablet computer system 1802 via power contacts (not shown) in the tablet computer system 1802 and the interior of the interface portion of the guide drawer 1806. Keyboard 1816 may be stored in and removed from keyboard slot 1818, in a manner similar to that described regarding FIGS. 1 and 14. Other features of the illustrated embodiment possess similar structure and functionality as previously described embodiments, including structural interface features, wireless communication characteristics and power couplings.

FIG. 19 depicts an alternate embodiment in accordance with the present invention. Tablet computer system 1900 sits in base unit 1904, firmly engaged in an upright position by interface lip 1906 formed in the interface portion of base unit 1904. Base unit 1904 is attached to a substantially vertical surface 1908. Keyboard 1904 is inserted into a keyboard receptacle in base unit 1904. Other features of the illustrated embodiment possess similar structure and functionality as previously described embodiments, including structural interface features, wireless communication characteristics and power couplings.

Moreover, while there have been described herein the principles of the present invention in conjunction with a specific computer system implementation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Examples of related modifications include a base unit hanging from beneath a horizontal support surface (such as a hanging cabinet bottom) or from a vertical support surface (such as a wall) from which a tablet computer is secured via a hanging or folding cradle or base unit, or an interlock or a grip disposed in a base unit. In addition, the support interface of the tablet computer case may be positioned on any or multiple sides of the tablet computer case. Furthermore, the base unit may support a removable keyboard by holding the keyboard below a support surface (such as a cabinet bottom) and above the support surface (such as a shelf in the base unit or a countertop).

Although claims have been formulated in this application to particular combinations of features, it should be understood that the scope of the disclosure herein also includes any novel feature or any novel combination of features disclosed either explicitly or implicitly for any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived thereof.

What is claimed is:

1. A housing for containing a computer system having a display unit a processor unit, and a power supply unit therein, said display unit being viewable by a user, said housing comprising:

a case including a front face, an opposing back face, and a first side having a first side surface and being positioned between said front face and said opposing back face, said front face having a first side surface positioned near said first side;

said front face having a see-through portion that allows said display unit to be viewable from outside said case;

a first handle including said first side surface, said first front surface, and a first grip positioned on said back face of said case near said first side;

wherein said first handle is graspable by a first hand of said user such that at least one finger of said first hand is capable of engaging said first grip, the palm of said first hand is capable of contacting said first side surface, and said first hand is capable of contacting said first front surface while said user can view said display unit through said see-through portion of said case; and a support structure operably attached to said case that holds said case upright on a support surface, wherein said support structure folds into a recess in said back face to form a portion of said first grip in said back face.

2. A housing for containing a computer system having a display unit, a processor unit, and a computer power supply unit therein and for engaging a weight-supporting base unit having a base unit guide and a base power supply port, said display unit being viewable by a user, said housing comprising:

a case having opposing front and back panels;

said front panel having a see-through portion that allows said display unit to be viewable from outside said case;

a case power supply port formed in said case positioned to engage an electrical lead coupled to said computer power supply unit;

an interface structure formed in said case, wherein said interface structure is capable of detachably engaging said case to said weight-supporting base unit and holding said case steady in an upright position said interface structure comprises a tab formed in said case,] wherein a tab formed in said case is capable of mating into a slot formed in said weight-supporting base unit; and a case guide positioned on said interface structure, wherein said case guide is capable of complementarily engaging said base unit guide to align said case power supply port with said base power supply port.

3. A housing for containing a computer system having a display unit, a processor unit, and a computer power supply unit therein and for engaging a weight-supporting base unit having a base unit guide and a base power supply port, said display unit being viewable by a user, said housing comprising:

a case having opposing front and back panels;

said front panel having a see-through portion that allows said display unit to be viewable from outside said case;

a case power supply port formed in said case positioned to engage an electrical lead coupled to said computer power supply unit;

an interface structure formed in said case, wherein said interface structure is capable of detachably engaging said case to said weight-supporting base unit and holding said case steady in an upright position; and a case guide positioned on said interface structure, wherein said case guide is capable of complementarily engaging said base unit guide to align said case power supply port with said base power supply port, said case guide includes a recessed area having a lip on one of said panels that is capable of complementarily sliding against a support tab in said weight-supporting base unit to horizontally align said case power supply port to correspond with said base power supply port.

4. A housing for containing a computer system having a display unit, a processor unit, and a computer power supply unit therein and for engaging a weight-supporting base unit having a base unit guide and a base power supply port, said display unit being viewable by a user, said housing comprising:

a case having opposing front and back panels;

said front panel having a see-through portion that allows said display unit to be viewable from outside said case;

a case power supply port formed in said case positioned to engage an electrical lead coupled to said computer power supply unit;

an interface structure formed in said case, wherein said interface structure is capable of detachably engaging said case to said weight-supporting base unit and holding said case steady in an upright position; and a case guide positioned on said interface structure, wherein said case guide is a recessed structure formed in said back panel being capable of complementarily engaging said base unit guide that protrudes from said weight-supporting base unit to align said case power supply port with said base power supply port.

5. A housing for containing a computer system having a display unit, a processor unit, and a computer power supply unit therein and for engaging a weight-supporting, base unit having a base unit guide and a base power supply port, said display unit being viewable by a user, said housing comprising:

a case having opposing front and back panels;

said front panel having a see-through portion that allows said display unit to be viewable from outside said case;

a case power supply port formed in said case positioned to engage an electrical lead coupled to said computer power supply unit;

an interface structure formed in said case, wherein said interface structure is capable of detachably engaging said case to said weight-supporting base unit and holding said case steady in an upright position; and a case guide positioned on said interface structure, wherein said case guide is a protruding structure formed in said back panel being capable of complementarily engaging said base unit guide that is recessed into said weight-supporting base unit to align said case power supply port with said base power supply port.

6. Apparatus for housing and supporting a computer system having a display unit, a processor unit, and a computer power supply unit therein, said display unit being viewable by a user, said housing comprising:

a case having opposing front and back panels;

said front panel having a see-through portion that allows said display unit to be viewable from outside said case;

a case power supply port formed in said case and positioned to engage a computer power lead coupled to said computer power supply unit;

a case interface structure disposed on said case, said case interface structure forming a tab that mates into a slot formed by said base interface structure;

a weight-supporting base unit;

a base power supply port formed in said weight-supporting base unit; and a base interface structure disposed on said weight-supporting base unit and being structurally complementary with said case interface structure to detachably engage said case interface structure;

wherein said case is held steady in an upright position and at least one of said interface structure includes an alignment guide to align said case power supply port to correspond with said base power supply port.

7. Apparatus for housing and supporting a computer system having a display unit, a processor unit, and a computer power supply unit therein, said display unit being viewable by a user, said housing comprising:

a case having opposing front and back panels;

said front panel having a see-through portion that allows said display unit to be viewable from outside said case;

a case power supply port formed in said case and positioned to engage a computer power lead coupled to said computer power supply unit, said case power supply port is positioned to engage a base power lead coupled to said computer power supply unit;

a case interface structure disposed on said case;

a weight-supporting base unit, having a base power supply unit;

a base power supply port formed in said weight-supporting base unit;

a base interface structure disposed on said weight-supporting base unit and being structurally complementary with said case interface structure to detachably engage said case interface structure; and wherein said case is held steady in an upright position and at least one of said interface structures includes an alignment guide to align said case power supply port to correspond with said base power supply port, said alignment guide to align said computer power lead in contact with said base power lead.

8. A base unit for holding a computer system steady in an upright position, said computer system having a computer interface structure and a computer power supply port formed therein, said base unit comprising:

a bottom portion steadily positioned on a support surface;

a top surface operably attached to said bottom portion;

a weight-supporting interface structure operably attached to said edge and forming a slot being capable of detachably engaging said computer system, wherein weight-supporting interface includes a receptacle that receives a keyboard, said weight supporting interface structure being capable of holding said computer system case above said receptacle;

an alignment guide disposed on said weight supporting interface structure and being complementary to said computer interface structure; and a base power supply port formed in said weight-supporting interface structure, said alignment guide being capable of aligning said base power supply port to correspond with said computer power supply port.

9. A base unit for holding a computer system steady in an upright position, said computer system having a computer interface structure and a computer power supply port formed therein, said base unit comprising:

a bottom portion steadily positioned on a support surface;

a top surface operably attached to said bottom portion;

a weight-supporting interface structure operably attached to said edge and forming a slot being capable of detachably engaging said computer system, wherein weight-supporting interface includes a receptacle that receives a keyboard, said weight supporting interface structure being capable of holding said computer system case below said receptacle;

an alignment guide disposed on said weight supporting interface structure and being complementary to said computer interface structure; and a base power supply port formed in said weight-supporting interface structure, said alignment guide being capable of aligning said base power supply port to correspond with said computer power supply port.

* * * * *